United States Patent
Oguz

(10) Patent No.: US 8,836,654 B2
(45) Date of Patent: Sep. 16, 2014

(54) APPLICATION WINDOW POSITION AND SIZE CONTROL IN (MULTI-FOLD) MULTI-DISPLAY DEVICES

(75) Inventor: Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 13/252,451

(22) Filed: Oct. 4, 2011

(65) Prior Publication Data

US 2013/0086508 A1    Apr. 4, 2013

(51) Int. Cl.
*G06F 3/041*    (2006.01)
*G06F 3/0488*   (2013.01)
*G06F 3/0484*   (2013.01)

(52) U.S. Cl.
CPC .. *G06F 3/04883* (2013.01); *G06F 2203/04806* (2013.01); *G06F 3/0484* (2013.01)
USPC ........... 345/173; 715/763; 715/764; 715/769; 715/779; 715/788

(58) Field of Classification Search
CPC .. G06F 3/04886; G06F 3/041; G06F 3/04817
USPC ................. 715/273, 779, 763, 764, 769, 788; 345/173
See application file for complete search history.

(56) References Cited

U.S. PATENT DOCUMENTS

| | | | | |
|---|---|---|---|---|
| 7,145,593 B2 * | 12/2006 | Yamaguchi et al. | ....... | 348/14.02 |
| 2005/0057435 A1 * | 3/2005 | Su | ................... | 345/1.3 |
| 2005/0066068 A1 * | 3/2005 | Karaoguz et al. | ................. | 710/1 |
| 2007/0085759 A1 * | 4/2007 | Lee et al. | ........................ | 345/1.1 |
| 2007/0136405 A1 * | 6/2007 | Weinstein et al. | ............ | 708/130 |
| 2008/0216125 A1 * | 9/2008 | Li et al. | ............................ | 725/62 |
| 2009/0122018 A1 | 5/2009 | Vymenets et al. | | |
| 2009/0289914 A1 * | 11/2009 | Cho | .............................. | 345/173 |
| 2009/0298548 A1 * | 12/2009 | Kim et al. | ..................... | 455/566 |
| 2010/0056223 A1 * | 3/2010 | Choi et al. | ..................... | 455/566 |

(Continued)

FOREIGN PATENT DOCUMENTS

| | | |
|---|---|---|
| EP | 2189889 A1 | 5/2010 |
| EP | 2302497 A2 | 3/2011 |
| WO | WO2010028405 A1 | 3/2010 |

OTHER PUBLICATIONS

International Search Report and Written Opinion—PCT/US2012/058639—ISA/EPO—Jun. 25, 2013.

(Continued)

*Primary Examiner* — Stephen Hong
*Assistant Examiner* — Ahamed I Nazar
(74) *Attorney, Agent, or Firm* — Jeffrey D. Jacobs

(57) ABSTRACT

Methods, systems, and/or devices are provided for application window management and/or application launching on multi-display devices. Application window management may including utilizing one or more touch displays to manage the size and/or position of a window representing an instance of an application. Some embodiments may involve maximizing the window from one display to multiple displays utilizing the touch display's functionality. Other embodiment may include a minimizing process involving decreasing the size of a window from display on multiple displays to a single display utilizing the touch display's functionality. Some embodiments may include application launch functionality based on the displacement of an icon associated with an application utilizing one or more touch displays from a multi-display device.

32 Claims, 13 Drawing Sheets

(56) References Cited

U.S. PATENT DOCUMENTS

| | | |
|---|---|---|
| 2010/0079355 A1* | 4/2010 | Kilpatrick et al. ............. 345/1.3 |
| 2010/0085382 A1* | 4/2010 | Lundqvist et al. ............ 345/659 |
| 2010/0122195 A1* | 5/2010 | Hwang ......................... 715/769 |
| 2010/0138767 A1* | 6/2010 | Wang et al. .................... 715/769 |
| 2010/0188345 A1* | 7/2010 | Keskin et al. ................. 345/173 |
| 2010/0262928 A1* | 10/2010 | Abbott .......................... 715/769 |
| 2011/0002096 A1* | 1/2011 | Thorson .................. 361/679.04 |
| 2011/0006971 A1* | 1/2011 | Ebey et al. ...................... 345/1.3 |
| 2011/0053650 A1* | 3/2011 | Chung et al. .................. 455/566 |
| 2011/0061021 A1* | 3/2011 | Kang et al. .................... 715/800 |
| 2011/0069016 A1 | 3/2011 | Victor |
| 2011/0126141 A1* | 5/2011 | King et al. .................... 715/769 |
| 2011/0209100 A1* | 8/2011 | Hinckley et al. .............. 715/863 |
| 2011/0273387 A1* | 11/2011 | Urawaki et al. ............... 345/173 |
| 2012/0001829 A1* | 1/2012 | Anttila et al. .................. 345/1.1 |
| 2012/0040720 A1* | 2/2012 | Zhang et al. .................. 455/557 |
| 2012/0249806 A1* | 10/2012 | Gong et al. ................. 348/207.1 |
| 2013/0145278 A1* | 6/2013 | Newell et al. ................. 715/738 |
| 2013/0222601 A1* | 8/2013 | Engstrom et al. ............. 348/159 |

OTHER PUBLICATIONS

Partial International Search Report—PCT/US2012/058639—ISA/EPO—Feb. 22, 2013.

* cited by examiner

APPLICATION WINDOW POSITION AND SIZE CONTROL IN (MULTI-FOLD) MULTI-DISPLAY DEVICES

BACKGROUND

Multi-display configurations are becoming far more prevalent in a variety of computing environments. By way of example, mobile device display configurations and computational capabilities are continuously expanding. Consequently, the range of applications and tasks to execute in these environments may become wider and more complex. Application windows are often a significant aspect of the user interface (UI) associated with applications. Therefore, different types of application window control may be an increasingly relevant UI design consideration, particularly as multi-display configurations and devices proliferate.

SUMMARY

Methods, systems, and/or devices are provided for application window management and/or application launching on multi-display devices. Application window management may include utilizing one or more touch displays to manage the size and/or position of a window representing an instance of an application. Some embodiments may involve maximizing the window from one display to multiple displays utilizing the touch display's functionality. Other embodiments may include a minimizing process involving decreasing the size of a window from display on or occupying multiple displays to a single display utilizing the touch display's functionality. Some embodiments may include application launch functionality based on the displacement of an icon associated with an application utilizing one or more touch displays from a multi-display device.

Some embodiments include a method to manage a window representing an instance of an application. The method may include: displaying, on a first touch display, the window representing the instance of the application, wherein the window is displayed as a first size; detecting one or more first input signals through the first touch display at a first location associated with the window representing the instance of the application; altering the displaying of the window from the first size to a second size based upon detecting the one or more first input signals through the first touch display; and/or altering the displaying of the window from the second size to a third size based upon detecting the one or more first input signals through the first touch display, wherein the third size results in the window being displayed on at least the first touch display and a second display. Detecting the one or more input signals may include detecting a continuous input extending for at least a first duration. Altering the displaying of the window from the first size to the second size based upon detecting the one or more input signals through the first touch display may occur during a first portion of the first duration. Altering the displaying of the window from the second size to the third size based upon detecting the one or more input signals through the first touch display may occur during a second portion of the first duration.

Detecting the one or more first input signals may include detecting a first plurality of input signals, wherein the first plurality of input signals includes a first subset of the first plurality of input signals and a second subset of the first plurality of input signals. Altering the displaying of the window from the first size to the second size based upon detecting the one or more input signals through the first touch display may occur after detecting the first subset plurality of input signals of the first plurality of input signals. Altering the displaying of the window from the second size to the third size based upon detecting the one or more input signals through the first touch display may occur after the second subset of input signals of the first plurality of input signals.

In some embodiments, the method to manage a window representing an instance of an application may further include altering the displaying of the window from the third size to a fourth size based upon detecting the one or more first input signals through the first touch display. The fourth size may result in the window being displayed on at least the first touch display, the second display, and a third display.

In some embodiments, the window displayed as the first size may occupy a first portion of the first touch display. The window displayed as the second size may occupy substantially all of the first touch display. The window displayed as the third size may occupy substantially all of the first touch display and the second display.

In some embodiments, the method to manage a window representing an instance of an application may further include detecting one or more second input signals through the first touch display at the first location associated with the window representing the instance of the application. The method may also include detecting one or more third input signals through the first touch display at a second location different from the first location associated with the window representing the instance of the application. The method may also include altering the displaying of the window from the third size to the second size based upon detecting the one or more second input signals and the one or more third input signals through the first touch display. The method may also include altering the displaying of the window from the second size to the first size based upon detecting the one or more second input signals and the one or more third input signals through the first touch display. Some embodiments may further include altering the displaying of the window from the first size to a minimized size where the window is no longer visible.

In some embodiments, the method to manage a window representing an instance of an application may further include receiving one or more user selections through the first touch display selecting at least the first size, the second size, or the third size.

Some embodiments include a system for managing a window representing an instance of an application. The system may include: a means for displaying, on a first touch display, the window representing the instance of the application, wherein the window is displayed as a first size; a means for detecting one or more first input signals through the first touch display at a first location associated with the window representing the instance of the application; a means for altering the displaying of the window from the first size to a second size based upon detecting the one or more first input signals through the first touch display; and/or a means for altering the displaying of the window from the second size to a third size based upon detecting the one or more first input signals through the first touch display, wherein the third size results in the window being displayed on at least the first touch display and a second display.

Some embodiments may include a multi-display device configured to manage a window representing an instance of an application. The multi-display device may include: a first touch display configured to display the window representing the instance of the application, wherein the window is displayed as a first size; an input detection module configured to detect one or more first input signals through the first touch display at a first location associated with the window representing the instance of the application; and/or an application window management module configured to: alter the displaying of the window from the first size to a second size based upon detecting the one or more first input signals through the first touch display; and/or alter the displaying of the window from the second size to a third size based upon detecting the one or more first input signals through the first touch display, wherein the third size results in the window being displayed on at least the first touch display and a second display.

The input detection module configured to detect the one or more input signals may include detecting a continuous input extending for at least a first duration. The application window management module configured to alter the displaying of the window from the first size to the second size based upon detecting the one or more input signals through the first touch display may occur during a first portion of the first duration. The application window management module configured to alter the displaying of the window from the second size to the third size based upon detecting the one or more input signals through the first touch display may occur during a second portion of the first duration.

The input detection module configured to detect the one or more first input signals may include detecting a first plurality of input signals, wherein the first plurality of input signals includes a first subset of first plurality of input signals and a second subset of the first plurality of input signals.

The application window management module configured to alter the displaying of the window from the first size to the second size based upon detecting the one or more input signals through the first touch display may occur after detecting the first subset of input signals of the first plurality of input signals. The application window management module configured to alter the displaying of the window from the second size to the third size based upon detecting the one or more input signals through the first touch display may occur after detecting the second subset of input signals of the first plurality of input signals.

The application window management module may be further configured to: alter the displaying of the window from the third size to a fourth size based upon detecting the one or more first input signals through the first touch display, wherein the fourth size results in the window being displayed on at least the first touch display, the second display, and a third display.

In some embodiments, the window displayed as the first size may occupy a first portion of the first touch display. The window displayed as the second size may occupy substantially all of the first touch display. The window displayed as the third size may occupy substantially all of the first touch display and the second display.

In some embodiments, the input detection module may be further configured to: detect one or more second input signals through the first touch display at the first location associated with the window representing the instance of the application; and detect one or more third input signals through the first touch display at a second location different from the first location associated with the window representing the instance of the application. The application window management module may be further configured to: alter the displaying of the window from the third size to the second size based upon detecting the one or more second input signals and the one or more third input signals through the first touch display; and alter the displaying of the window from the second size to the first size based upon detecting the one or more second input signals and the one or more third input signals through the first touch display. The application window management module may be further configured to: alter the displaying of the window from the first size to a minimized size where the window is no longer visible.

In some embodiments, the application window management module may be further configured to receive one or more user selections through the first touch display selecting at least the first size, the second size, or the third size.

Some embodiments include a computer program product for managing a window representing an instance of an application that includes a computer-readable medium that may include: code for displaying, on a first touch display, the window representing the instance of the application, wherein the window is displayed as a first size; code for detecting one or more first input signals through the first touch display at a first location associated with the window representing the instance of the application; code for altering the displaying of the window from the first size to a second size based upon detecting the one or more first input signals through the first touch display; and/or code for altering the displaying of the window from the second size to a third size based upon detecting the one or more first input signals through the first touch display, wherein the third size results in the window being displayed on at least the first touch display and a second display.

Some embodiments include a method to launch an instance of an application. The method may include: displaying, on a first touch display, an icon representing the application, wherein the icon is located in a first position on the first touch display; detecting a user input through the first touch display at the icon at the first position; detecting a movement of the user input along at least a surface of the first touch display from the first position on the first touch display; launching, with a processor, the instance of the application upon detecting an end to the movement of the user input; and/or displaying a window representing the launched instance of the application on at least the first touch display or a second display.

In some embodiments, the method to launch an instance of an application may further include: displacing the icon from the first position along a path of the movement of the user input during the detected movement of the user input along the surface of the first touch display; and/or returning the displaced icon to the first position after the processor has begun launching the instance of the application.

Detecting the movement of the user input along at least a surface of the first touch display from the first position on the first touch display may include detecting the movement of the user input along the surface of the first touch display from the first position on the first touch display and along a surface of a second display, wherein the second display is a second touch display. Launching, with the processor, the instance of the application upon detecting the end to the movement of the user input may include launching, with the processor, the instance of the application upon detecting the end to the movement of the user input on the second touch display. Displaying the window representing the launched instance of the application on at least the first touch display or the second display may include displaying the window representing the launched instance of the application on the second display.

In some embodiments, the method to launch an instance of an application may further include: receiving a user selection through the first touch display indicating an icon arrangement mode; and/or enabling the icon arrangement mode based on receiving the user selection, where enabling the icon arrangement mode disables the processor from launching the instance of the application upon detecting the end to the movement of the user input along the surface of the first touch display.

In some embodiments, the method to launch an instance of an application may further include: receiving a user selection through the first touch display indicating an application launch mode; and/or enabling the application launch mode based on receiving the user selection, where enabling the application launch mode enables the processor to launch the instance of the application upon detecting the end to the movement of the user input along the surface of the first touch display.

In some embodiments, the method to launch an instance of an application may further include receiving a user selection through the first touch display selecting a position for displaying the window representing the launched instance of the application on at least the first touch display or a second display.

Some embodiments include a system for launching an instance of an application. The system may include: a means for displaying, on a first touch display, an icon representing the application, wherein the icon is located in a first position on the first touch display; a means for detecting a user input through the first touch display at the icon at the first position; a means for detecting a movement of the user input along at least a surface of the first touch display from the first position on the first touch display; a means for launching, with a processor, the instance of the application upon detecting an end to the movement of the user input; and/or a means for displaying a window representing the launched instance of the application on at least the first touch display or a second display.

Some embodiments include a multi-display device configured to launch an instance of an application. The multi-display device may include first touch display configured to display an icon representing the application, wherein the icon is located in a first position on the first touch display. The multi-display device may include an input detection module configured to: detect a user input through the first touch display at the icon at the first position; and/or detect a movement of the user input along at least a surface of the first touch display from the first position on the first touch display. The multi-display device may include an application launch module configured to launch the instance of the application upon detecting an end to the movement of the user input. The multi-display device may include at least the first touch display or a second display configured to display a window representing the launched instance of the application on at least the first touch display or a second display.

The multi-display device may be further configured to displace the icon from the first position along a path of the movement of the user input during the detected movement of the user input along the surface of the first touch display and/or return the displaced icon to the first position after the processor has begun launching the instance of the application.

The input detection module configured to detect the movement of the user input along at least a surface of the first touch display from the first position on the first touch display may include detecting the movement of the user input along the surface of the first touch display from the first position on the first touch display and along a surface of a second display, wherein the second display is a second touch display. The application launch module being further configured to launch the instance of the application upon detecting the end to the movement of the user input on the second touch display. At least the first touch display or the second display configured to display the window representing the launched instance of the application on at least the first touch display or the second display may include displaying the window representing the launched instance of the application on the second display.

In some embodiments, the multi-display device may be further configured to: receive a user selection through the first touch display indicating an icon arrangement mode; and/or enable the icon arrangement mode based on receiving the user selection, where enabling the icon arrangement mode disables the application launch module from launching the instance of the application upon detecting the end to the movement of the user input along the surface of the first touch display.

In some embodiments, the multi-display device may be further configured to: receive a user selection through the first touch display indicating an application launch mode; and/or enable the application launch mode based on receiving the user selection, where enabling the application launch mode enables the application launch module to launch the instance of the application upon detecting the end to the movement of the user input along the surface of the first touch display.

In some embodiments, the multi-display device may be further configured to receive a user selection through the first touch display selecting a position for displaying the window representing the launched instance of the application on at least the first touch display or a second display.

Some embodiments include computer program product for launching an instance of an application that includes a computer-readable medium that may include: code for displaying, on a first touch display, an icon representing the application, wherein the icon is located in a first position on the first touch display; code for detecting a user input through the first touch display at the icon at the first position; code for detecting a movement of the user input along at least a surface of the first touch display from the first position on the first touch display; code for launching, with a processor, the instance of the application upon detecting an end to the movement of the user input; and/or code for displaying a window representing the launched instance of the application on at least the first touch display or a second display The foregoing has outlined rather broadly examples according to disclosure in order that the detailed description that follows may be better understood. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and/or devices are provided for application window management and/or application launching on multi-display devices. Application window management may include utilizing one or more touch displays to manage the size and/or position of a window representing an instance of an application. Some embodiments may involve maximizing the window from one display to multiple displays utilizing the touch display's functionality. Other embodiments may include a minimizing process involving decreasing the size of a window from display on or occupying multiple displays to a single display utilizing the touch display's functionality. Some embodiments may include application launch functionality based on the displacement of an icon associated with an application utilizing one or more touch displays from a multi-display device.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
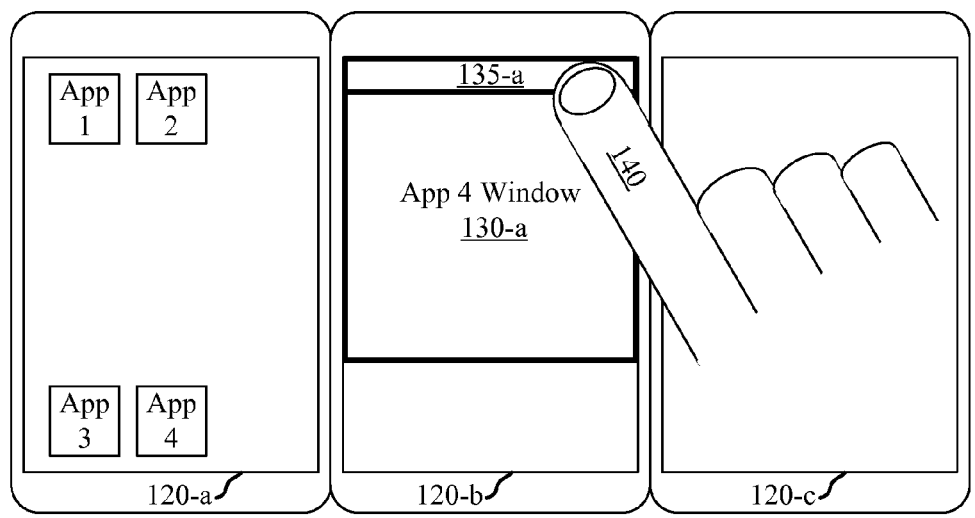
FIGS. 1A, 1B, 1C, and 1D show different configurations of a multi-display device configured for application window management in accordance with various embodiments.
Figure 1B:
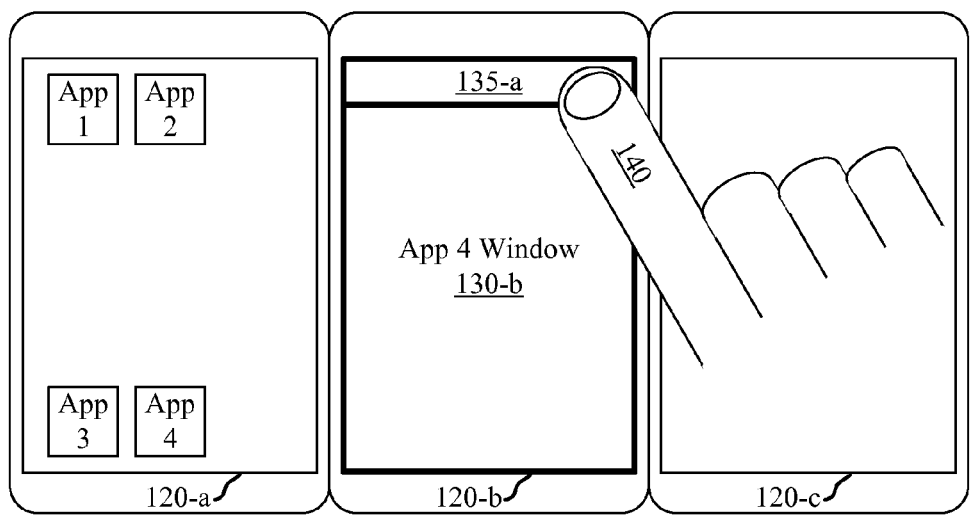
Figure 1C:
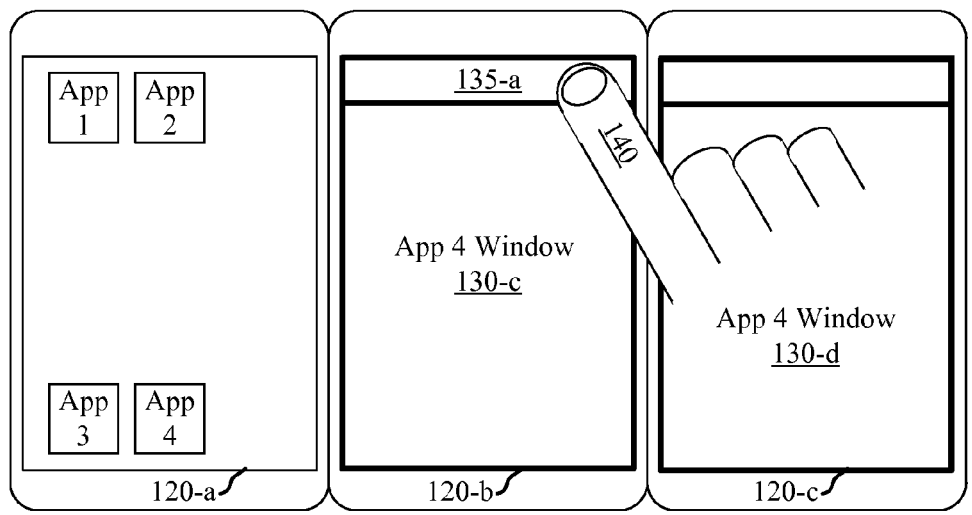

Referring first to FIGS. 1A, 1B, 1C, and/or 1D, these figures show generic multi-display device 110 in accordance with various embodiments. One or more of the displays 120 of device 110 may also be a touch display configured to receive input from a user, though some of the displays may also be configured without this functionality. The methods, devices, systems, and/or techniques described may be generally applicable to multi-display (possibly multi-fold) devices with two or more displays. In some cases, a given display may be referred to as a display panel. In some cases, a multi-display device such as device 110 may be reconfigurable into different display geometries. Some embodiments may include multi-touch multi-display computer platforms. Some embodiments may include multiple devices, where each device includes one or more displays. Merely by way of example, device 110 includes 3 displays 120-a, 120-b, and 120-c. At least display 120-b may be configured as a touch display.

Some embodiments may utilize a multi-display device such as device 110 to manage one or more windows representing an instance of an application. For example, FIG. 1A shows a configuration 100-a where a window 130-a, representing an instance of an application, may be displayed on one of the displays, display 120-b in this case. Display 120-b is configured as a touch display for this example. The application may be referred to as Application 4 for convenience. Window 130-a may be displayed with a specific size, which may be referred to as a first size for this example. A user may determine the size of window 130-a in some embodiments.

FIG. 1A also shows one example of how a user may provide input to the touch display 120-b, in this case through using a finger and/or finger tip 140. Other input devices may also be utilized as is generally known with touch displays. The user may utilize his or her finger 140 to provide one or more input signals that touch display 120-b may detect. In this example, a user may touch a certain window boundary bar 135-a, which may be part of window 130-a. Other portions of either window 130-a, window boundary bar 135-a, or even display 120-b may be utilized to receive input from the user. Window boundary bar 135-a may be described as a first location associated with window 130-a representing the instance of the application. It is worth noting that although a finger and touch screens are shown as the input and displays, other forms of inputs and/or displays may be used (e.g., a mouse, stylus, and/or a multi-screen display).

By providing an input through the display 120-b as shown in FIG. 1A, for example, the size of window 130-a may be altered. This is shown in FIG. 1B, where a configuration 100-b shows a window 130-b which represents window 130-a being altered from the first size, shown in FIG. 1A, to a second size as shown with window 130-b. Thus, detecting the one or more first input signals through the touch display 120-b, the window size may be altered.

FIG. 1B shows also that the user may continue to provide input to the touch display 130-b as shown with finger tip 140 touching window boundary bar 135-a. As a result, the displaying of the window may continue to be altered. This is shown in FIG. 1C. FIG. 1C shows a configuration 100-c where the displaying of the window 130 may be changed and/or altered from the second size to a third size based upon detecting one or more input signals through the touch display 120-b. In this configuration, window 130-b of FIG. 1B has been altered now to show on two displays, display 120-b and 120-c. The window 130 may be referred to as two parts, window 130-c and 130-d. The overall size of this configuration 100-c may be referred to as a third size and generally results in the window 130 being displayed on at least two displays 120, displays 120-b and 120-c in this case.

Figure 1D:
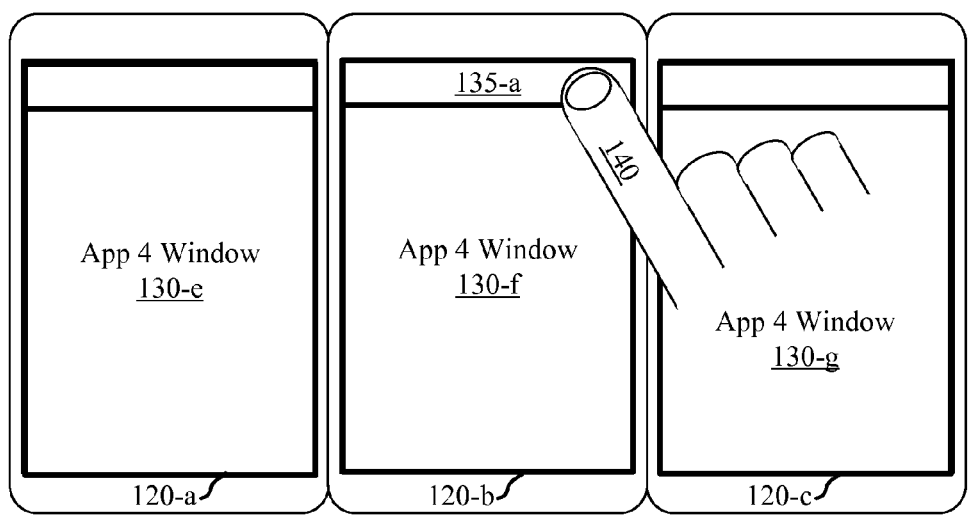

The process of continuing to increase and/or to maximize the size of windows 130 representing an instances of an application is shown in FIG. 1D. In this configuration 100-d, input from the user at window boundary bar 135-a results in window 130 (i.e. window 130-c and 130-d) from FIG. 1C be altered to cover three displays 120-a, 120-b, and 120-c through window 130 represented as window portions 130-e, 130-f, and 130-g.

A user may provide a variety of different types and/or locations of input to signal to a touch display 120 that the user may want to alter the size of windows 130 as discussed above. For example, a user could provide a single tap (or a brief touch) anywhere within the window 130 of a previously not active, i.e. not in focus, application that will lead to the selection i.e. activation or bringing into focus, of that application window. In some cases, a user could provide an input through a prolonged or continuous input or touch on the upper window boundary bar, such as the window boundary bars 135-a referred to above. This may lead to a phased maximization of the application window 130 gradually occupying an increasing number of displays 120 while the touch may be maintained and until potentially occupying all available display panels as illustrated in FIG. 1D. Different combinations of these input types and/or locations may be utilized in different embodiments.

In some embodiments, following the launch of an application, a first stage of maximization may occur that may enable window 130 to occupy one display 120 in full. Prolonged and/or continuous input or touch and/or taps may be enabled for maximization control in some embodiments. In addition, a configuration, such as configuration 100-d of FIG. 1D where all displays 120 including the main display 120-a that shows icons for applications are occupied by the application window 130, may be disabled and/or reconfigured by a user in some cases to make main display 120-a available to the user in an unobstructed fashion.

In some embodiments, a user may configure this expansion and/or maximization process. For example, a user may configure an application window management function so that window 130 leaves a certain segment of each display 120 unoccupied. A user may also configure an application window management function to utilize different speeds or rates of input to trigger different functionality, such as window size increase. A user may also configure an application window management function such that different displays 120 may be utilized. A user may also configure an application window management function regarding the size and/or position of windows 130 in general.

Figure 2A:
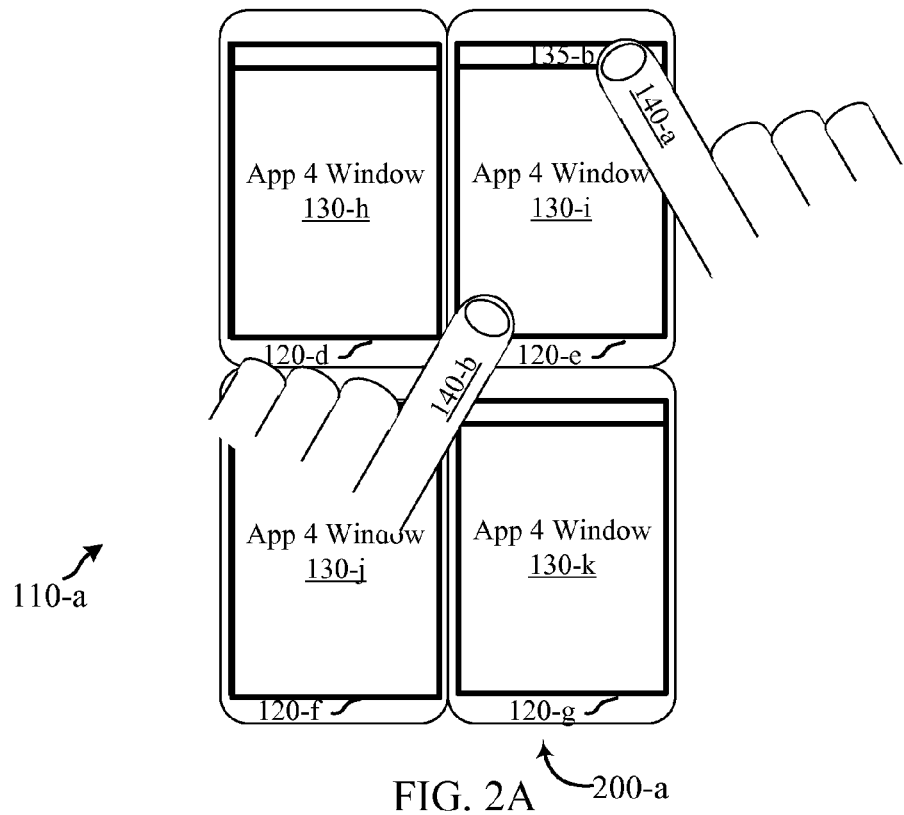
FIGS. 2A, 2B, 2C, and 2D show different configurations of a multi-display device configured for application window management in accordance with various embodiments.
Figure 2B:
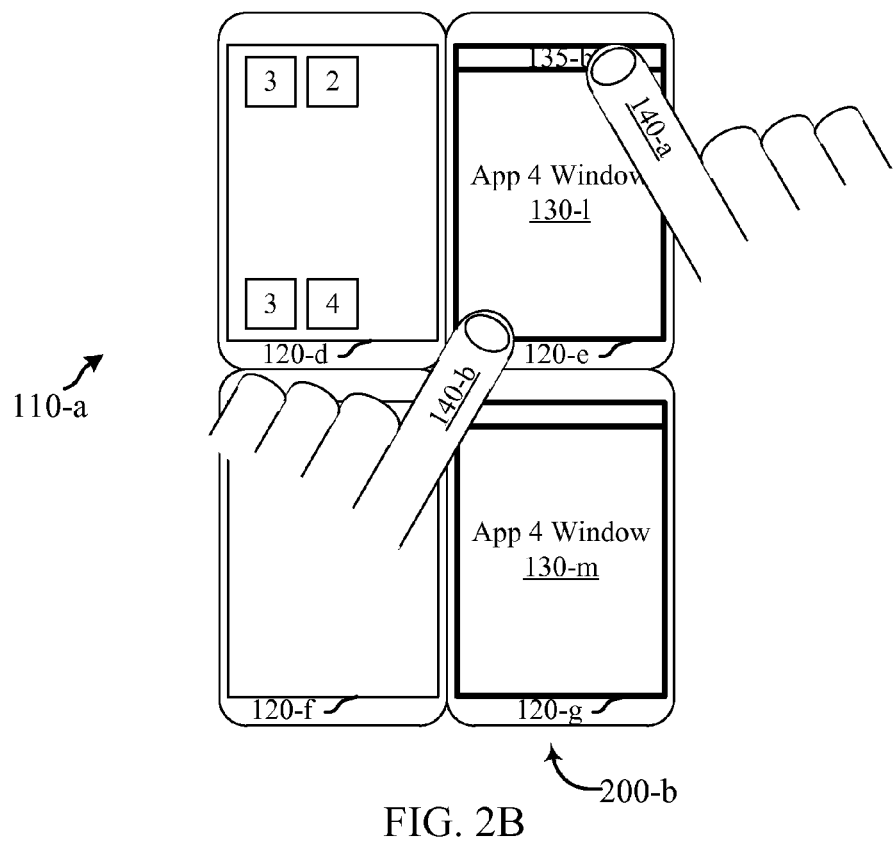
Figure 2C:
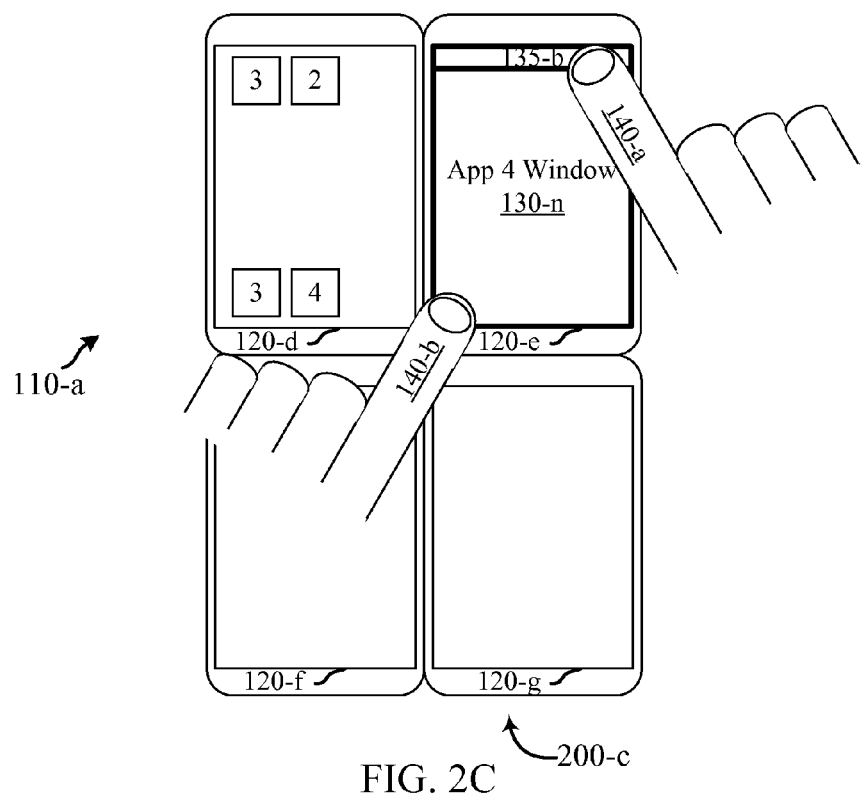

Turning now to FIGS. 2A, 2B, 2C, and/or 2D, these figures show another multi-display device 110-a in accordance with various embodiments. Merely by way of example, this multi-display device 110-a include four displays 120-d, 120-e, 120-f, and 120-g. Some embodiments may utilize a multi-display device such as device 110-a to manage one or more windows representing an instance of an application. These figures show a series of configurations 200-a, 200-b, 200-c, and 200-d that may complement the configuration such as configurations 100 of FIGS. 1 above. Configurations 200-a, 200-b, 200-c, and 200-d may reflect a decreasing in the size of windows 130 or a phased out minimization of an application window 130. This process of decreasing the size of window 130 may enable it to occupy gradually fewer displays 120. One or more of the displays 120 of device 110 may also be a touch display configured to receive input from a user, though some of the displays may also be configured without this functionality. The methods, devices, systems, and/or techniques described may be generally applicable to multi-display (possibly multi-fold) devices with two or more displays 120. In some cases, a given display 120 may be referred to as a display panel. In some cases, a multi-display device such as device 110-a may be reconfigurable into different display geometries. Some embodiments may include multi-touch multi-display computer platforms. Some embodiments may include multiple devices, where each device includes one or more displays 120.

Some embodiments may utilize a multi-touch functionality of a touch display 120. This may allow for certain processes to occur when a display 120 receives two or more concurrent inputs, or touches in some cases. It is again worth noting, however, that although a finger and touch screens are shown as the input and displays, other forms of inputs and/or displays and inputs may be used (e.g., a mouse, stylus, and/or a multi-screen display).

Turning first to FIG. 2A, a configuration 200-a is shown where an instance of an application (Application 4 in this example), is represented through a window 130 that includes four portions 130-h, 130-i, 130-j, and 130-k, spread over the four displays 120-d, 120-e, 120-f, and 120-g. In some embodiments, a user may provide two concurrent inputs to begin the process of decreasing the size and/or number of displays 120 upon which the window 130 representing the instance of the application may be represented, spread, and/or expanded. For example, configuration 200-a shows a first user input from finger tip 140-a touching window boundary bar 135-b, providing a first input signal. In addition, finger tip 140-b may concurrently touch a portion of window 130-i, providing a second input signal. The display 120-e may detect both of these input signals, and as a result, alter the displaying of the window 130 (i.e. window portions 130-h, 130-i, 130-j, and/or 130-k). This is shown in FIG. 2B.

FIG. 2B shows an altered window 130 as a result of the detection of the multiple concurrent input signals through display 120-e. In this case, window 130 has been altered to decrease it size, now reflected as window portions 130-l and 130-m. Note also that the window 130 is now displayed on two displays 120-e and 120-g, rather than all four displays 120-d, 120-e, 120-f, and 120-g. A user may configure the device 110-a such that different displays 120 may be utilized as a window 130 may be decreased in size. For example, displays 120-d and 120-f may be utilized instead of 120-e and 120-g, or some other combination.

Figure 2D:
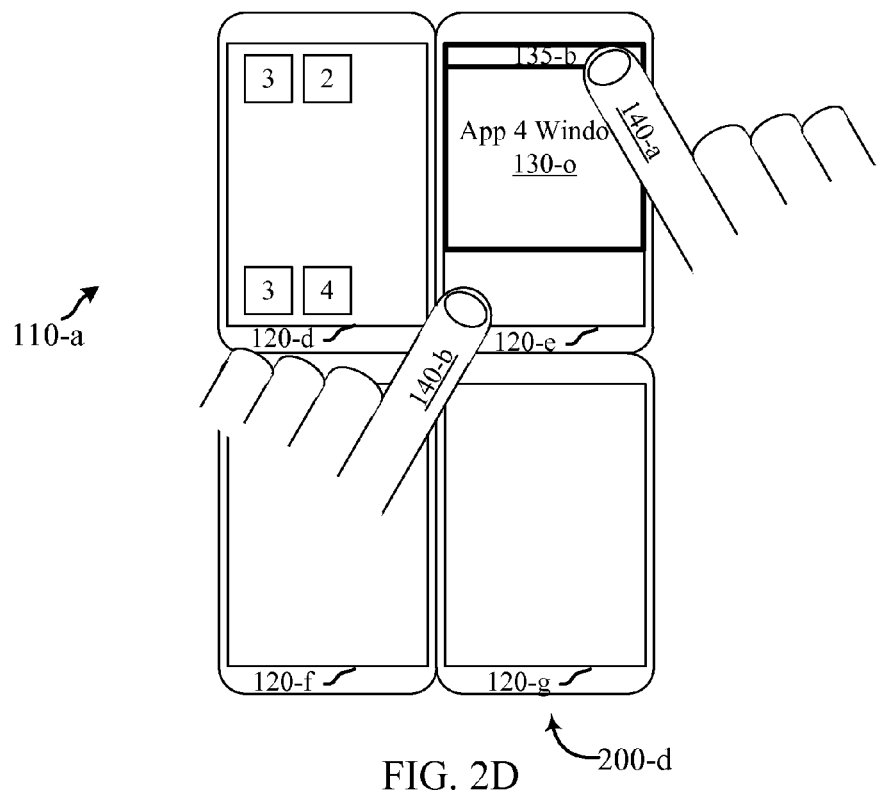

As multiple concurrent input signals may be detected, such as through finger tip 140-a touching window boundary bar 135-b and finger tip 140-b touching window 130-n on a portion of window 130, the size of window 130 may continue to be decreased. For example, FIG. 2C and FIG. 2D show configurations 200-c and 200-d, respectively, where window 130 is reduced to being displayed on an individual display 120-e, first as window 130-n and then as a smaller window 130-o. In some cases, this size decrease may not only reduce the number of displays 120 that may be utilized to display a window 130 representing an instance of an application, it may also eventually result in the window 130 no longer being displayed, or merely displayed as an icon.

As discussed above with respect to configurations 100 of FIGS. 1A-1D, a user may provide a variety of different types and/or locations of input to signal to a touch display 120 that the user may want to alter the size of windows 130 as discussed above. With respect to configurations such as configurations 200 in general, two or more concurrent inputs may be utilized and/or detected. For example, a first continuously maintained input may be provided, which may be for a certain duration. A second input, either continuously maintained for the duration or effecting taps of an appropriate count, may also be provided. These inputs may be provided at different portions of a display 120, such as on the upper window boundary bar 135-b and/or another portion of display 120 associated with a window 130. The second input may be provided in a manner analogous to how a single input may be used increasing a window size, as shown with FIGS. 1A-1D for example. In this case, the effect is reversed, i.e. for window shrinking. In addition, the multiple concurrent inputs may be provided in other ways as discussed above. For example, a user could provide a single tap (or a brief touch)

anywhere within the window 130 of a previously not active, i.e. not in focus, application leading to the selection, i.e. activation or bringing into focus, of that application window. In some cases, a user could provide an input through a prolonged or continuous input or touch on the upper window boundary bar, such as the window boundary bar 135-b referred to above. A combination of concurrent inputs may lead to a phased minimization of the application window 130 gradually occupying a decreasing number of displays 120 while the touch may be maintained. Different combinations of these input types and/or locations may be utilized in different embodiments.

In some embodiments, the final state of window minimization may result in different final configurations. For example, the final state could return a window 130 to a launch state of the window (partially occupying a single panel); an example of this is shown in FIG. 2D. In some cases, a final window 130 may be a 'minimized to dock' state where the window is no longer visible. In some embodiments, a user may configure a device 110 to achieve either of these final states or other states. If the user wants to minimize the application window 130 towards a display panel other than the panel partially occupied upon application launch then the window state transition sequence for minimization will need to differ from the reverse ordered state transition sequence realized for maximization.

In some embodiments, a window 130 may be stretched with both touches positioned on two different window corners and with one touch stationary and the other in motion, or with both touches in motion for window maximization and minimization.

For embodiments that may include folding displays for compacting the device 110 with respect to application window minimization, a user may configure windows 130 to achieve either a gradual window shrinking towards still exposed display 120 or an immediate complete minimization. In some embodiments, a common window boundary bar may provide one or more shortcut boxes for maximization that may enable immediate largest extent maximization per user preference. Short cut boxes may also be provided for minimization that may enable immediate minimization to the 'dock'. Some embodiments may include short cut boxes for restoration that may revert to pre-minimization state from dock or may revert to launch state from all other states.

Figure 3A:
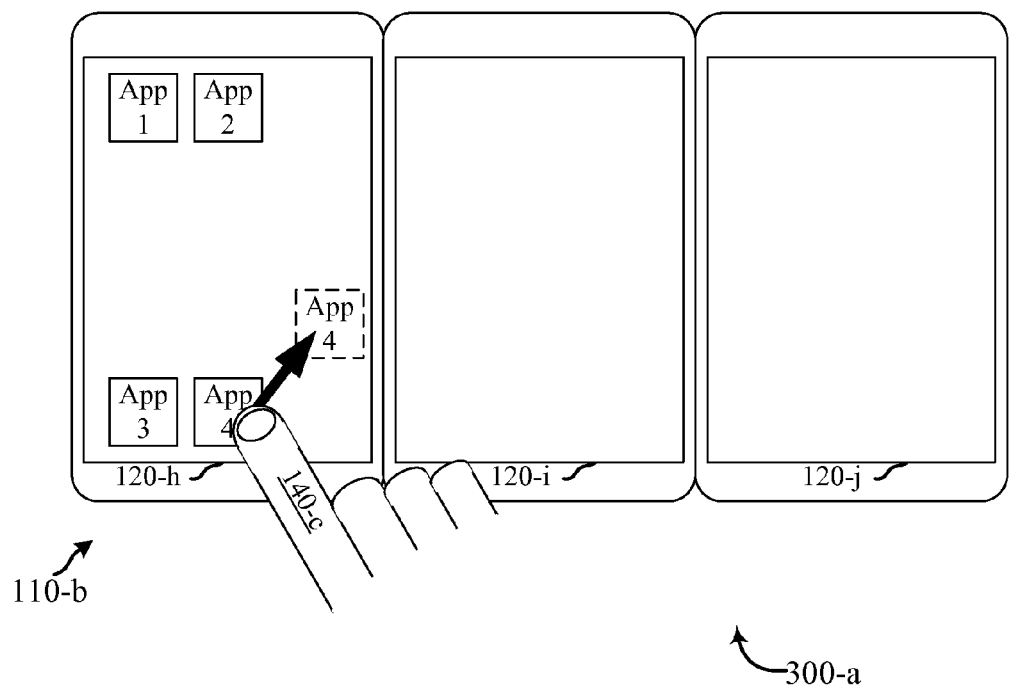
FIGS. 3A and 3B show different configurations of a multi-display device configured for application launch in accordance with various embodiments.
Figure 3B:
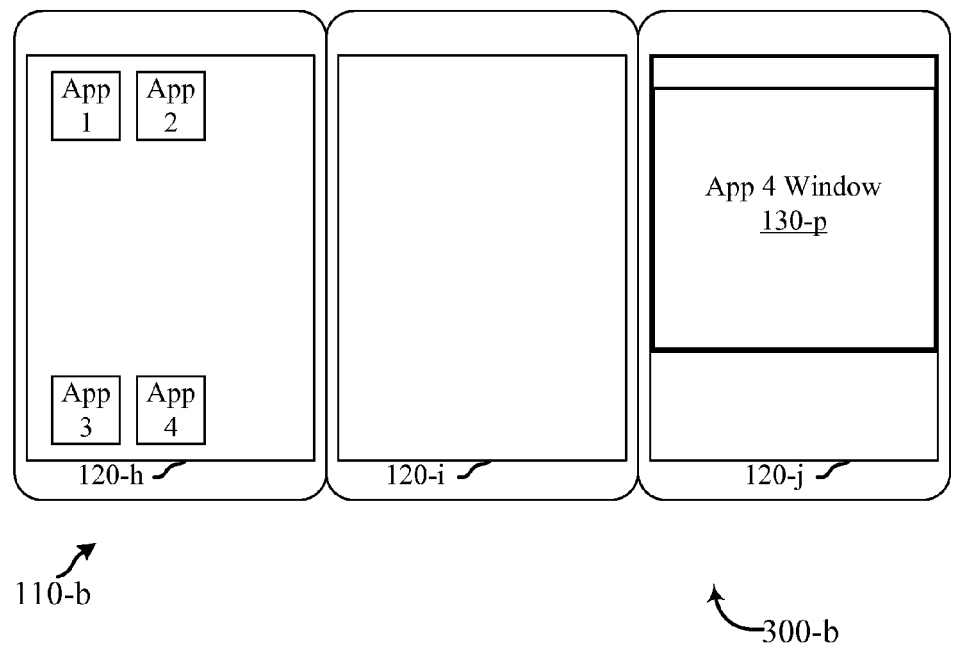

Turning now to FIGS. 3A and 3B, configurations 300-a and 300-b are shown utilizing a multi-display device such as device 110-b to launch an instance of an application in accordance with various embodiments. One or more of the displays 120 of device 110-b may also be a touch display configured to receive input from a user, though some of the displays may also be configured without this functionality. The methods, devices, systems, and/or techniques described may be generally applicable to multi-display (possibly multi-fold) devices with two or more displays. In some cases, a given display 120 may be referred to as a display panel. In some cases, a multi-display device such as device 110-b may be reconfigurable into different display geometries. Some embodiments may include multi-touch multi-display computer platforms. Some embodiments may include multiple devices, where each device includes one or more displays. Merely by way of example, device 110-b includes three displays 120-h, 120-i, and 120-j. At least display 120-h may be configured as a touch display.

For example, FIG. 3A shows device 110-b that includes a display 120-h that provides numerous application icons, shown as App 1, App 2, App 3, and App 4. Display 120-h may be configured as a touch display. Configuration 300-a shows a user providing a user input, in this case through finger tip 140-c at an application icon, such as App 4 icon. The user input may be detected through the touch display 120-h. A movement of the user input, i.e., the finger tip 140-c along a surface of the touch display 120-h from the first position on the touch display 120-h, may be detected. This movement in effect may displace or perturb the location of the application icon, as shown in configuration 300-a. As a result of this detecting an end of the movement of the user input, an instance of the application may be launched. This is shown in FIG. 3B with configuration 300-b, where a window 130-p representing an instance of an application is shown; in this case, the window 130-p represents an instance of Application 4. In this example, window 130-p is displayed on display 120-j, which may or may not be a touch display. In some configurations, window 130-p may be displayed on other displays, such as display 120-h or display 120-i. A user may configure a device such as device 110-b in order that window 130-p may be displayed upon launch where the user wants window 130-p to appear.

Figure 3C:
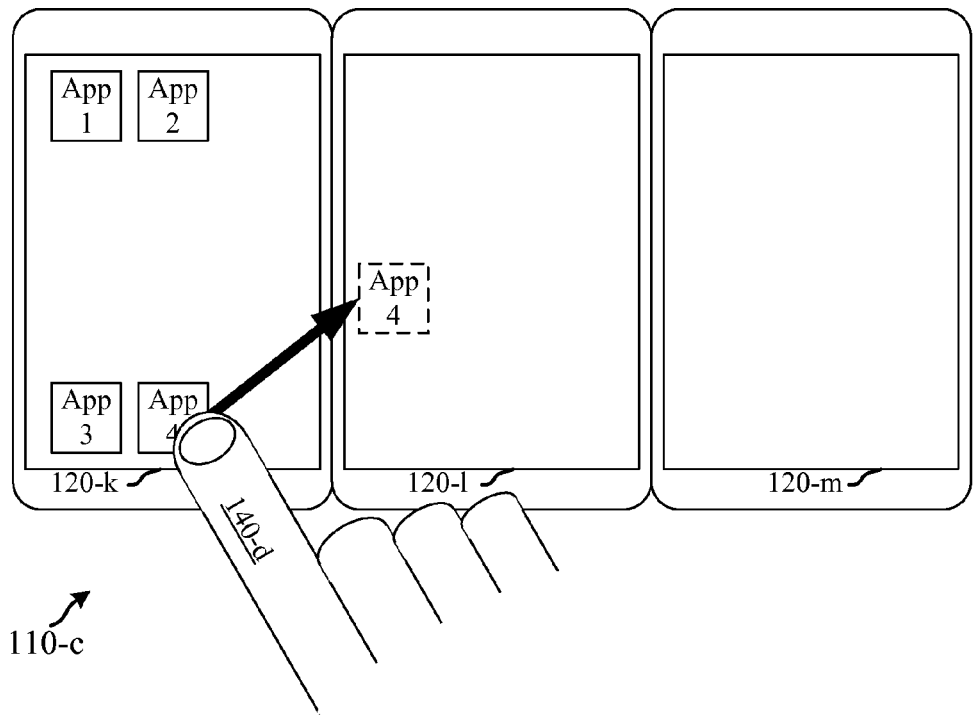
FIGS. 3C and 3D show different configurations of a multi-display device configured for application launch in accordance with various embodiments.
Figure 3D:
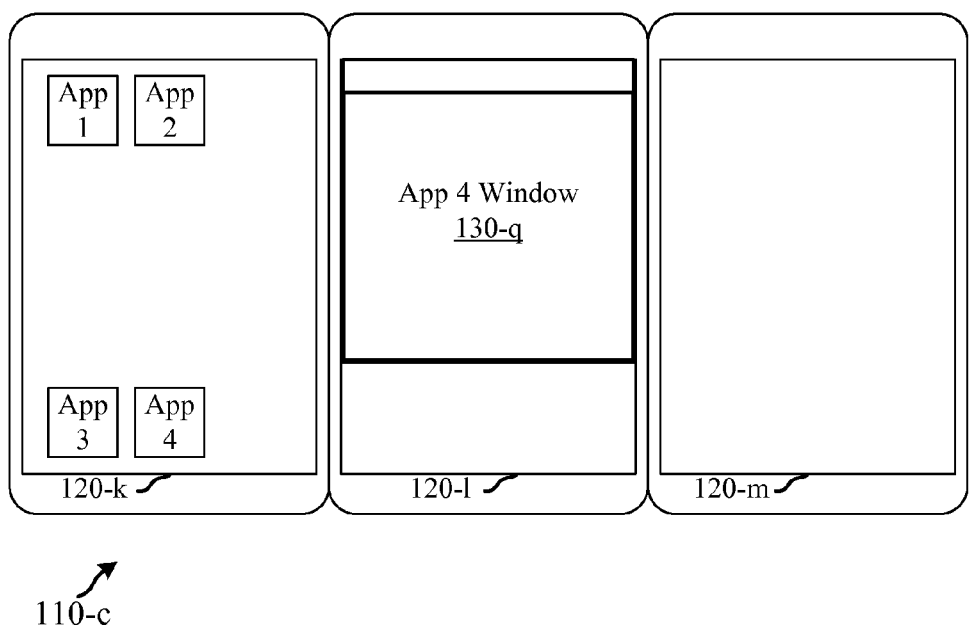

FIGS. 3C and 3D show configurations 300-c and 300-d, respectively, that reflect utilizing a multi-display device such as device 110-c to launch an instance of an application in accordance with various embodiments. One or more of the displays 120 of device 110-c may also be a touch display configured to receive input from a user, though some of the displays may also be configured without this functionality. The methods, devices, systems, and/or techniques described may be generally applicable to multi-display (possibly multi-fold) devices with two or more displays. In some cases, a given display may be referred to as a display panel. In some cases, a multi-display device such as device 110-c may be reconfigurable into different display geometries. Some embodiments may include multi-touch multi-display computer platforms. Some embodiments may include multiple devices, where each device includes one or more displays. Merely by way of example, device 110-c includes 3 displays 120-k, 120-l, and 120-m. At least displays 120-k and 120-l may be configured as a touch display.

In this embodiment an icon, in this case the icon for Application 4 (App 4), again may be moved or dragged by a user input, i.e. finger tip 140-d. In this case, the user input 140-d may move, perturb, and/or drag the icon from display 120-k to display 120-l as shown in configuration 300-c. In effect, this may involve dragging and dropping the application icon to a display 120-l other than the display 120-k where it is originally located. Upon detecting this move, the application may be launched within the destination display 120-l, reflected as window 130-q representing an instance of the application. The original application icon may not relocate but may snap back to its original location in display 120-k, as shown in configuration 300-d.

In some embodiments, the application icon or shortcut may be provided with a configuration property enabling the user to define which display panel the user may want to be used by default to launch its application window 130 when a conventional double or single click method is used. In some embodiments, upon launch, the application window 130 may be positioned flush to the top edge of a display 120. Other positioning may also be utilized. Positioning may be designated through an icon/shortcut configuration property in some embodiments. Positioning may also be identified through a drag-and-drop action as shown with configurations 300-c and 300-d of FIGS. 3C and 3D, respectively.

Embodiments may provide specific positioning to facilitate the window management as discussed above with respect to FIGS. 1A-1D and/or 2A-2D. While the application launch methods discussed above with respect to FIGS. 3A-3D may be utilized for launching an application and a window 130 representing an instance of the application to be utilized with the window management of FIGS. 1A-1D and 2A-2D, the application launch may also utilize conventional double-click and (if shortcuts are enabled) single-click methods in conjunction with window management disclosed herein such as with FIGS. 1A-1D and/or 2A-2D.

Some embodiments may also utilize icon arrangement modes, application launch modes, and/or application window management modes. In some embodiments, application launch mode may be coupled with application window management mode i.e. combined functionality in a single mode. For example, an icon arrangement mode may be enabled by a user selection. The icon arrangement mode may disable a processor for launching an instance of an application upon detecting the end of a movement of a user input as may be utilized with launch configurations such as configurations 300. An icon arrangement mode may also be referred to as a desktop organization mode. A complementary mode such as an application launch mode may also be utilized when a user wants to allow for the launch functionality based on the detected movement of a user input to launch an instance of an application. The reason for this distinction may be that certain acts performed by the user on application windows 130 and/or icons (such as dragging them around on the full extent of desktop provided by the combination of all, two or more, available display panels) may correspond to different purposes and lead to different end results depending on the operational context in effect. A user may change the operational context from icon arrangement mode to application launch mode and vice versa. This user selection may be achieved through a high level interface such as a user selectable menu item or a key combination, for example. Application launch mode or an icon arrangement mode may be set as a default. Similarly, an application window management mode may also be utilized in some embodiments to allow for functionality as shown herein including FIGS. 1A-1D and/or 2A-2D.

Figure 4A:
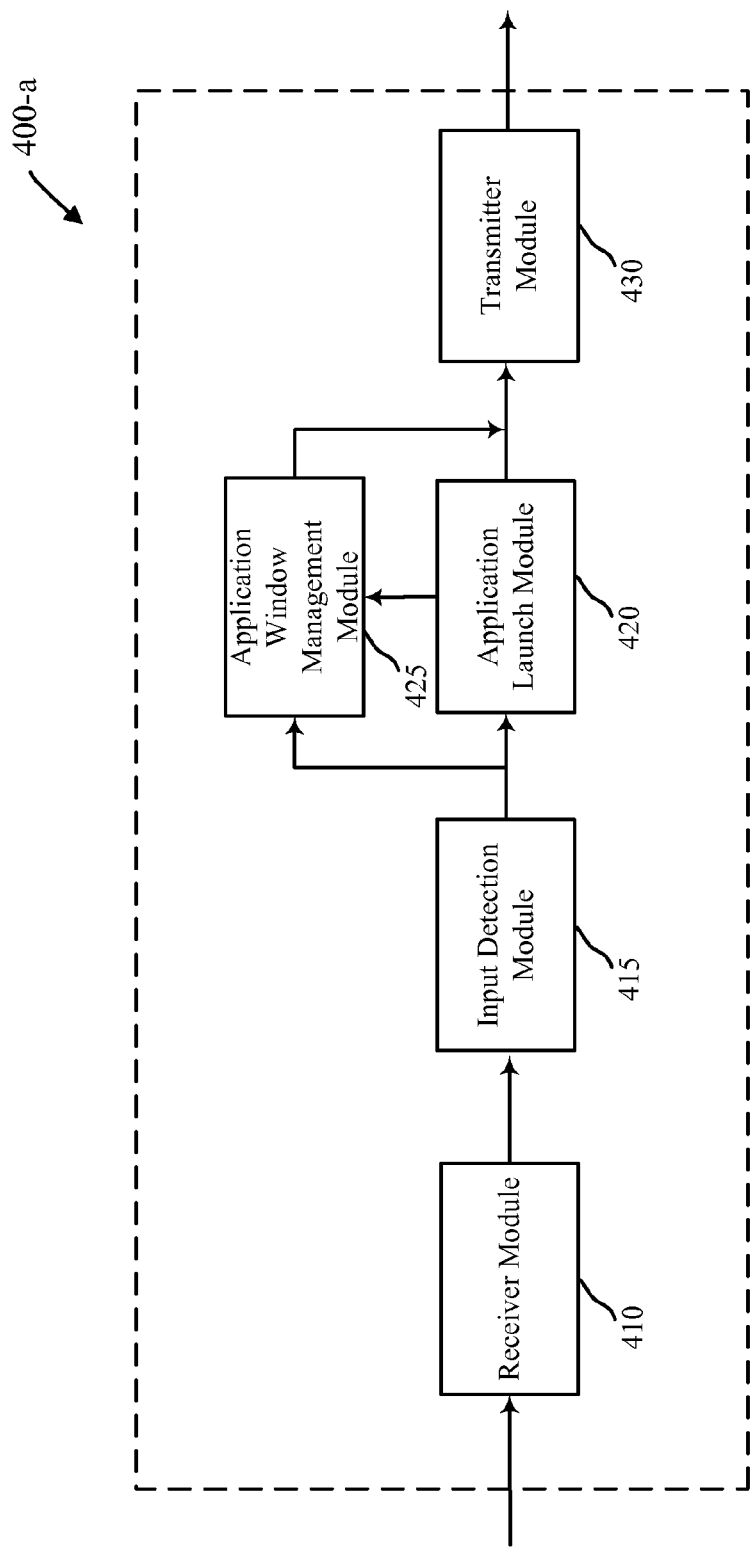
FIG. 4A shows a block diagram of a device configured for window application management and/or application launch in accordance with various embodiments.

Turning next to FIG. 4A, a block diagram illustrates a device 400-a that may include application launch and/or application window management functionality. The device 400-a may be an example of multi-display devices 110, 110-a, 110-b, and/or 110-c as described with reference to FIGS. 1A-1D, 2A-2D, and/or 3A-3D, respectively, or may be a device integrating the application launch and/or application window management functionality. The device 400-a may also be a processor. The device 400-a may include a receiver module 410, an input detection module 415, an application launch module 420, an application window management module 425, and/or a transmitter module 430. Each of these components may be in communication with each other.

These components of the device 400-a may, individually or collectively, be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 410 may receive different signals, such as input signals from a user through one or more touch displays. The input detection module 415 may utilize the received input signals to determine different aspects of the input signal that the application launch module 420 and/or the application window management module 425 may utilize to either launch an instance of an application or manage the size and/or location of a window representing an instance of the application. The application launch module 420 and/or the application window management module 425 may transmit information through transmitter module 430 such that a window representing instance of an application may be launched and displayed on a display and/or changed in size and/or location.

In some embodiments, the application window management module 425 may be utilized to configure and/or represent an instance of the application to be displayed, such as displaying a window with a first size. The input detection module may detect one or more first input signals through a touch display at a first location associated with the window representing the instance of the application. The application window management module 425 may then be utilized to alter the window for display from the first size to a second size based upon detecting the one or more first input signals through the first touch display at the input detection module 415. The application window management module 425 may then be utilized to alter the window for display from the second size to a third size based upon detecting the one or more first input signals through the first touch display at the input detection module 415. The third size may result in the window being displayed on at least the first touch display and a second display.

In some embodiments, detecting with the input detection module 415 the one or more input signals may include detecting a continuous input extending for at least a first duration. Altering the displaying of the window from the first size to the second size with the application window management module 425 based upon detecting the one or more input signals through the first touch display with the input detection module 415 may occur during a first portion of the first duration. Altering the displaying of the window from the second size to the third size with the application window management module 425 based upon detecting the one or more input signals through the first touch display with the input detection module 415 may occur during a second portion of the first duration.

Detecting the one or more first input signals with the input detection module 415 may include detecting multiple first input signals. The multiple first input signals may include a first subset of multiple input signals and a second subset of multiple input signals. Altering the displaying of the window from the first size to the second size with the application window management module 425 based upon detecting the one or more input signals through the first touch display with the input detection module 415 may occur after detecting the first subset of multiple input signals of multiple first input signals. Altering the displaying of the window from the second size to the third size with the application window management module 425 based upon detecting the one or more input signals through the first touch display with the input detection module 415 may occur after the second subset of multiple input signals of the multiple first input signals. Altering the displaying of the window from the third size to a fourth size with the application window management module 425 may occur based upon detecting one or more first input signals through the first touch display with the input detection module 415. The fourth size may result in the window being displayed on at least the first touch display, the second display, and a third display. In some embodiments, the subsets of multiple input signals may include single constituent touches of a multi-touch input. In some embodiments, the subsets of multiple input signals may include temporal segments of a prolonged multi-touch input leading to phased multiple changes.

In some embodiments, the window displayed as the first size may occupy a first portion of the first touch display. The window displayed as the second size may occupy substantially all of the first touch display. The window displayed as the third size may occupy substantially all of the first touch display and the second display.

In some embodiments, the input detection 415 module may further detect one or more second input signals through the first touch display at the first location associated with the window representing the instance of the application. One or more third input signals may be detected through the first touch display with the input detection module 415 at a second location different from the first location associated with the window representing the instance of the application. The displaying of the window may be altered from the third size to the second size based upon detecting the one or more second input signals and the one or more third input signals through the first touch display. The displaying of the window may be altered from the second size to the first size based upon detecting the one or more second input signals and the one or more third input signals through the first touch display with the input detection module 415. The displaying of the window may be altered from the first size to a minimized size where the window is no longer visible.

In some embodiments, the receiver module 410 may receive one or more user selections through the first touch display selecting at least the first size, the second size, or the third size.

The application launch module 420 may be utilized to launch instances of an application in accordance with various embodiments. For example, an icon representing the application may be displayed on a first touch display. The icon may be located in a first position on the first touch display. In some cases, the application window management module 425 may play a role in locating the position of the icon. The input detection module 415 may detect a user input through the first touch display at the icon at the first position. The input detection module 415 may also detect a movement of the user input along at least a surface of the first touch display from the first position on the first touch display. The application launch module 420 may then launch the instance of the application upon receiving a signal from the input detection module 415 that it has detected an end to the movement of the user input. The application window management module 425 may manage the displaying of the window representing the launched instance of the application on at least the first touch display or a second display.

In some embodiments, the application window management module 425 may displace the icon from the first position along a path of the movement of the user input during the detected movement, detected with the input detection module 415, of the user input along the surface of the first touch display. The application window management module 425 may return the displaced icon to the first position after the application launch module 420 has begun launching the instance of the application.

Detecting the movement of the user input along at least a surface of the first touch display from the first position on the first touch display with the input detection module 415 may include detecting the movement of the user input along the surface of the first touch display from the first position on the first touch display and along a surface of a second display. The second display may be a second touch display. Launching the instance of the application with the application launch module 420 upon detecting the end to the movement of the user input may include launching the instance of the application upon detecting the end to the movement of the user input on the second touch display. The application window management module 425 may be utilized to configure the window representing the launched instance of the application to be displayed on at least the first touch display or the second display such that the window representing the launched instance of the application is displayed on the second display.

In some embodiments, the receiver module 410 may receive a user selection through the first touch display indicating an icon arrangement mode. The icon arrangement mode may be enabled based on receiving the user selection. Enabling the icon arrangement mode may disable the device 400-a, the application launch module 420 in particular, from launching the instance of the application upon detecting the end to the movement of the user input along the surface of the first touch display with the input detection module 415.

In some embodiments, the receiver module 410 may receive a user selection through the first touch display indicating an application launch mode. The application launch mode may be enabled based on receiving the user selection. Enabling the application launch mode may enable the device 400-a to launch the instance of the application utilizing the application launch module 420 upon detecting the end to the movement of the user input along the surface of the first touch display with the input detection module 415.

In some embodiments, the receiver module 410 may receive a user selection through the first touch display selecting a position for displaying the window representing the launched instance of the application on at least the first touch display or a second display that the application window management module 425 may utilize in displaying the window.

Figure 4B:
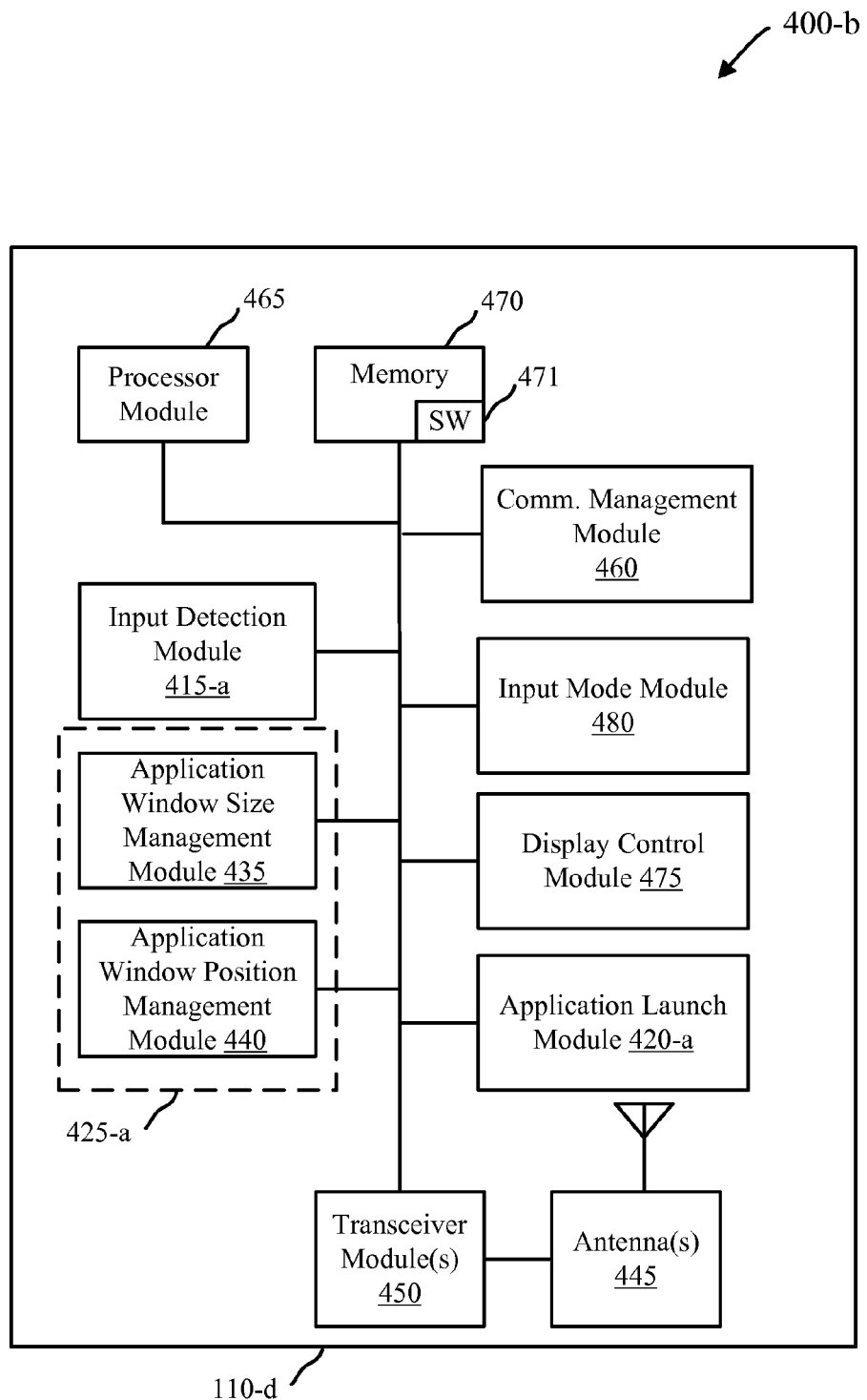
FIG. 4B shows a block diagram of a multi-display device configured for window application management and/or application launch in accordance with various embodiments.

FIG. 4B shows a block diagram 400-b of multi-display device 110-d that may be an example of multi-display devices 110, 110-a, 110-b, 110-c, or device 400-a as described with reference to FIGS. 1A-1D, 2A-2D, 3A-3D, and/or 4A. The multi-display device 110-d may have any of various configurations, such as personal computers (e.g., laptop computers, net book computers, tablet computers, desk top computers, etc.), cellular telephones, PDAs, digital video recorders (DVRs), internet appliances, gaming consoles, e-readers, etc.

The multi-display device 110-d may include antenna(s) 445, transceiver module(s) 450, input detection module 415-a, input mode module 480, display control module 475, application launch module 420-a, application window management module 425-a (including application window size management module 435 and/or application window position management module 440), a memory 470, a communication management module, 460, and/or a processor module 465 which each may be in communication, directly or indirectly, with each other (e.g., via one or more buses). The transceiver module(s) 450 may be configured to communicate bi-directionally, via the antenna(s) 445 with a base station or other network device. Transceiver module(s) 450 may include a modem configured to modulate the packets and provide the modulated packets to the antennas 445 for transmission, and to demodulate packets received from the antennas 445. While the multi-display device may include a single antenna, the multi-display device 110-d may include multiple antennas 445 for multiple links.

The memory 470 may include random access memory (RAM) and read-only memory (ROM). The memory 470 may store computer-readable, computer-executable software code 471 containing instructions that are configured to, when executed, cause the processor module 465 to perform various functions described herein (e.g., call processing, database management, message routing, etc.). Alternatively, the software 471 may not be directly executable by the processor module 465 but be configured to cause the computer (e.g., when compiled and executed) to perform functions described herein.

The processor module 465 may include an intelligent hardware device, e.g., a central processing unit (CPU) such as those made by Intel® Corporation or AMD®, or ARM®, a microcontroller, an application specific integrated circuit (ASIC), etc. The processor module 465 may include a speech encoder (not shown) configured to receive audio via a microphone, convert the audio into packets (e.g., 30 ms in length) representative of the received audio, provide the audio packets to the transceiver module(s) 450, and provide indications of whether a user is speaking. Alternatively, an encoder may only provide packets to the transceiver module(s) 450, with the provision or withholding/suppression of the packet itself providing the indication of whether a user is speaking.

According to the architecture of FIG. 4B, the multi-display device 110-d may further include a communications management module 460. The communications management module 460 may manage communications with base stations, network devices, and/or other devices 110. By way of example, the communications management module 460 may be a component of the device 110-d in communication with some or all of the other components of the devices 110 via a bus. Alternatively, functionality of the communications management module 460 may be implemented as a component of a transceiver module(s) 450, as a computer program product, and/or as one or more controller elements of the processor module 465.

Some components of the device 110-d may, individually or collectively, be implemented, in whole or in part, with instructions embodied in a memory, formatted to be executed by one or more general or application-specific processors. They may also be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

The components for device 110-d may be configured to implement the aspects discussed above with respect to device 400-a in FIG. 4A and may not be repeated here for the sake of brevity. For example, the input detection module 415-a may be an example of the input feedback module 415 of FIG. 4A. The application launch module 420-a may be an example of the application launch module 420 of FIG. 4A. The application window management module 425-a may be an example of the application window management module 425.

In addition, device 110-d includes input mode module 480. Input mode module 480 may perform different functions, including enabling different modes, as discussed above, such as icon arrangement modes, application launch modes, and/or application window management modes. Device 110-d may include a display control module 475. Display control module 475 may be utilized to control the multiple displays that may be part of or in communication with a device such as device 100-d. Display control module 475, for example, may be utilized to coordinate displaying a window on multiple displays; display control module 475 may work in conjunction with application window management module 425-a. Application window management module 425-a is shown including application window size management module 435 and/or application window position management module 440. Application window size management module 435, for example, may be utilized to control the size of a window display on a multi-display device. In particular, application window size management module 435 may be utilized to determine how the size of windows may increase and/or decrease in different embodiments. Application window position management module 440 may be utilized to control where a window may be positioned on a multi-display device. This may include where a window may be displayed upon launch, for example, and/or positioning as the size of a window may be changed in different embodiments.

Figure 5:
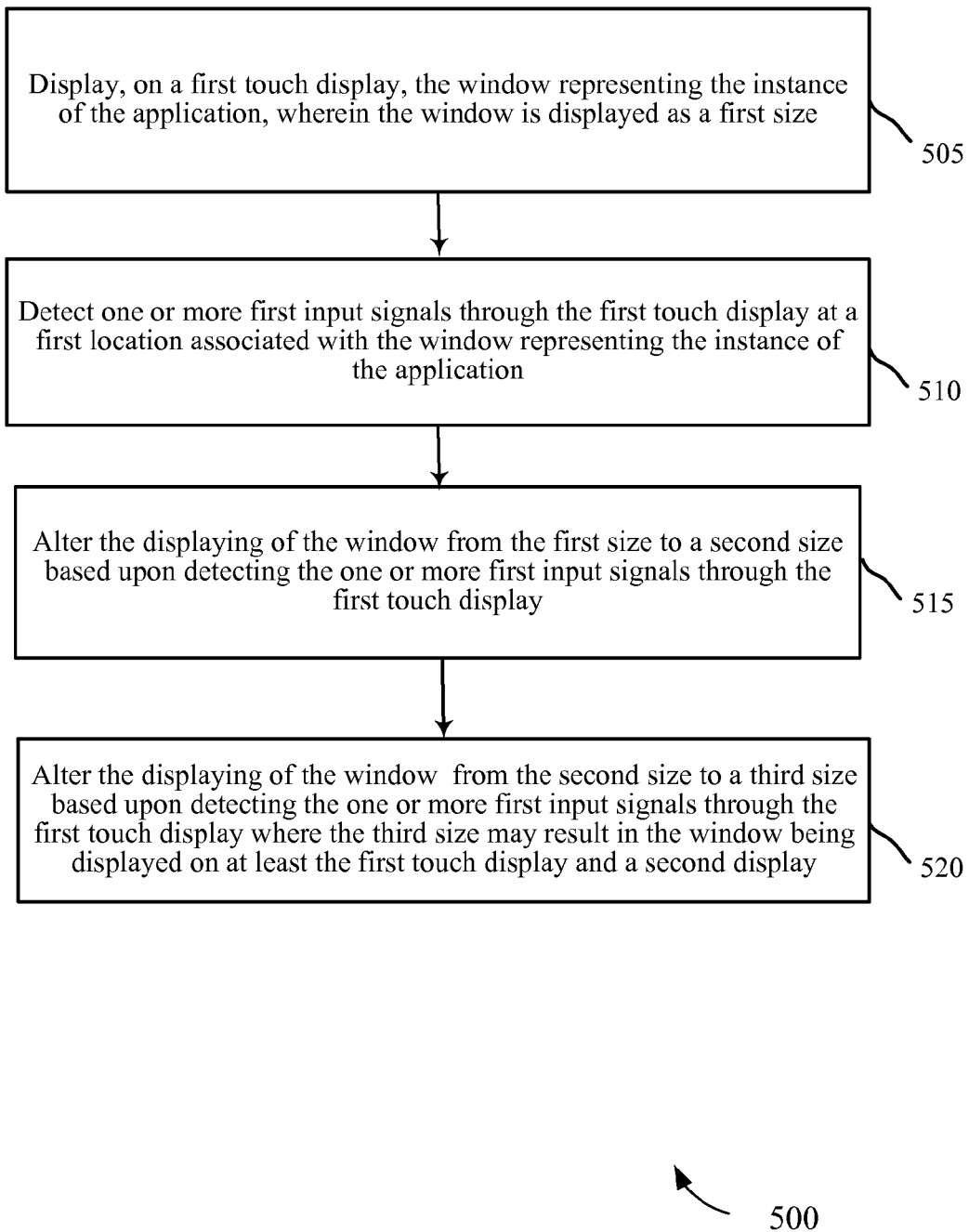
FIG. 5 is a flowchart of a method for managing application windows in accordance with various embodiments.

Turning to FIG. 5, a flow diagram of a method 500 to manage a window representing an instance of an application in accordance with various embodiments is provided. Method 500 may be implemented on a variety of different multi-display device(s) including, but not limited to, devices 110, 110-a, 110-b, 110-c, 400-a, and/or 110-d of FIGS. 1A-1D, 2A-2D, 3A-3D, and 4A-4B, respectively.

At block 505, on a first touch display, the window representing the instance of the application may be displayed. The window may be displayed as a first size. At block 510, one or more first input signals may be detected through the first touch display at a first location associated with the window representing the instance of the application. At block 515, the displaying of the window may be altered from the first size to a second size based upon detecting the one or more first input signals through the first touch display. At block 520, the displaying of the window may be altered from the second size to a third size based upon detecting the one or more first input signals through the first touch display. The third size may result in the window being displayed on at least the first touch display and a second display.

Detecting the one or more input signals may include detecting a continuous input extending for at least a first duration. Altering the displaying of the window from the first size to the second size based upon detecting the one or more input signals through the first touch display may occur during a first portion of the first duration. Altering the displaying of the window from the second size to the third size based upon detecting the one or more input signals through the first touch display may occur during a second portion of the first duration.

Detecting the one or more first input signals may include detecting multiple first input signals. The multiple first input signals may include a first subset of multiple input signals and a second subset of multiple input signals. Altering the displaying of the window from the first size to the second size based upon detecting the one or more input signals through the first touch display may occur after detecting the first subset of multiple input signals of multiple first input signals. Altering the displaying of the window from the second size to the third size based upon detecting the one or more input signals through the first touch display may occur after detecting the second subset of multiple input signals of the multiple first input signals. Altering the displaying of the window from the third size to a fourth size may occur based upon detecting one or more first input signals through the first touch display. The fourth size may result in the window being displayed on at least the first touch display, the second display, and a third display.

In some embodiments, the window displayed as the first size may occupy a first portion of the first touch display. The window displayed as the second size may occupy substantially all of the first touch display. The window displayed as the third size may occupy substantially all of the first touch display and the second display.

Method 500 may further include detecting one or more second input signals through the first touch display at the first location associated with the window representing the instance of the application. One or more third input signals may be detected through the first touch display at a second location different from the first location associated with the window representing the instance of the application. The displaying of the window may be altered from the third size to the second size based upon detecting the one or more second input signals and the one or more third input signals through the first touch display. The displaying of the window may be altered from the second size to the first size based upon detecting the one or more second input signals and the one or more third input signals through the first touch display. The displaying of the window may be altered from the first size to a minimized size where the window is no longer visible.

In some embodiments, one or more user selections may be received through the first touch display selecting at least the first size, the second size, or the third size.

Figure 6:
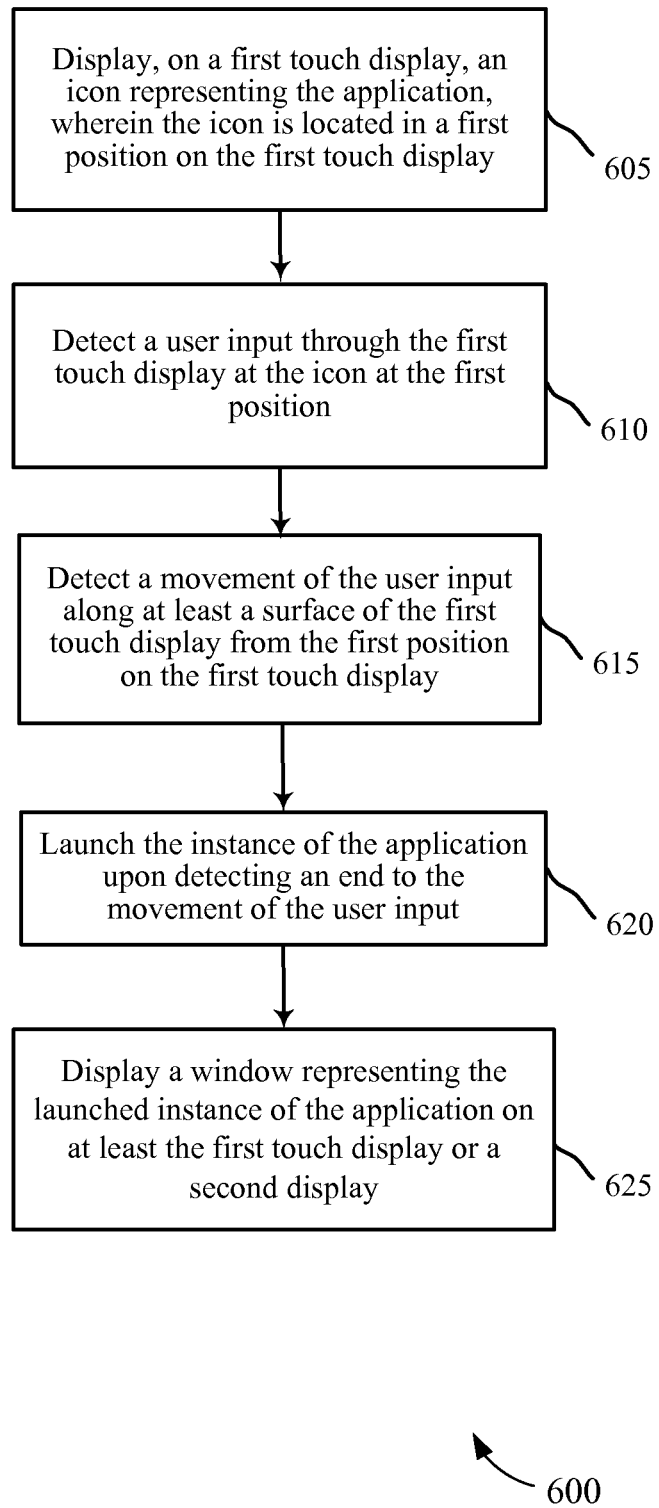
FIG. 6 is a flowchart of a method for launching applications in accordance with various embodiments.

Turning to FIG. 6, a flow diagram of a method 600 to launch an instance of an application in accordance with various embodiments is provided. Method 600 may be implemented on a variety of different multi-display device(s) including, but not limited to, devices 110, 110-*a*, 110-*b*, 110-*c*, 400-*a*, and/or 110-*d* of FIGS. 1A-1D, 2A-2D, 3A-3D, and 4A-4B, respectively.

At block 605, an icon representing the application may be displayed on a first touch display. The icon may be located in a first position on the first touch display. At block 610, a user input may be detected through the first touch display at the icon at the first position. At block 615, a movement of the user input may be detected along at least a surface of the first touch display from the first position on the first touch display. At block 620, the instance of the application may be launched by a processor upon detecting an end to the movement of the user input. At block 625, a window representing the launched instance of the application may be displayed on at least the first touch display or a second display.

Method 600 may further include in some embodiments displacing the icon from the first position along a path of the movement of the user input during the detected movement of the user input along the surface of the first touch display. The displaced icon may be returned to the first position after the processor has begun launching the instance of the application.

Detecting the movement of the user input along at least a surface of the first touch display from the first position on the first touch display may include detecting the movement of the user input along the surface of the first touch display from the first position on the first touch display and along a surface of a second display. The second display may be a second touch display. Launching, with the processor, the instance of the application upon detecting the end to the movement of the user input may include launching the instance of the application upon detecting the end to the movement of the user input on the second touch display. Displaying the window representing the launched instance of the application on at least the first touch display or the second display may include displaying the window representing the launched instance of the application on the second display.

Method 600 may further include receiving a user selection through the first touch display indicating an icon arrangement mode. The icon arrangement mode may be enabled based on receiving the user selection. Enabling the icon arrangement mode may disable the processor from launching the instance of the application upon detecting the end to the movement of the user input along the surface of the first touch display.

Method 600 may further include in some embodiments receiving a user selection through the first touch display indicating an application launch mode. The application launch mode may be enabled based on receiving the user selection. Enabling the application launch mode may enable the processor to launch the instance of the application upon detecting the end to the movement of the user input along the surface of the first touch display.

Method 600 may further include in some embodiments receiving a user selection through the first touch display selecting a position for displaying the window representing the launched instance of the application on at least the first touch display or a second display.

Figure 7:
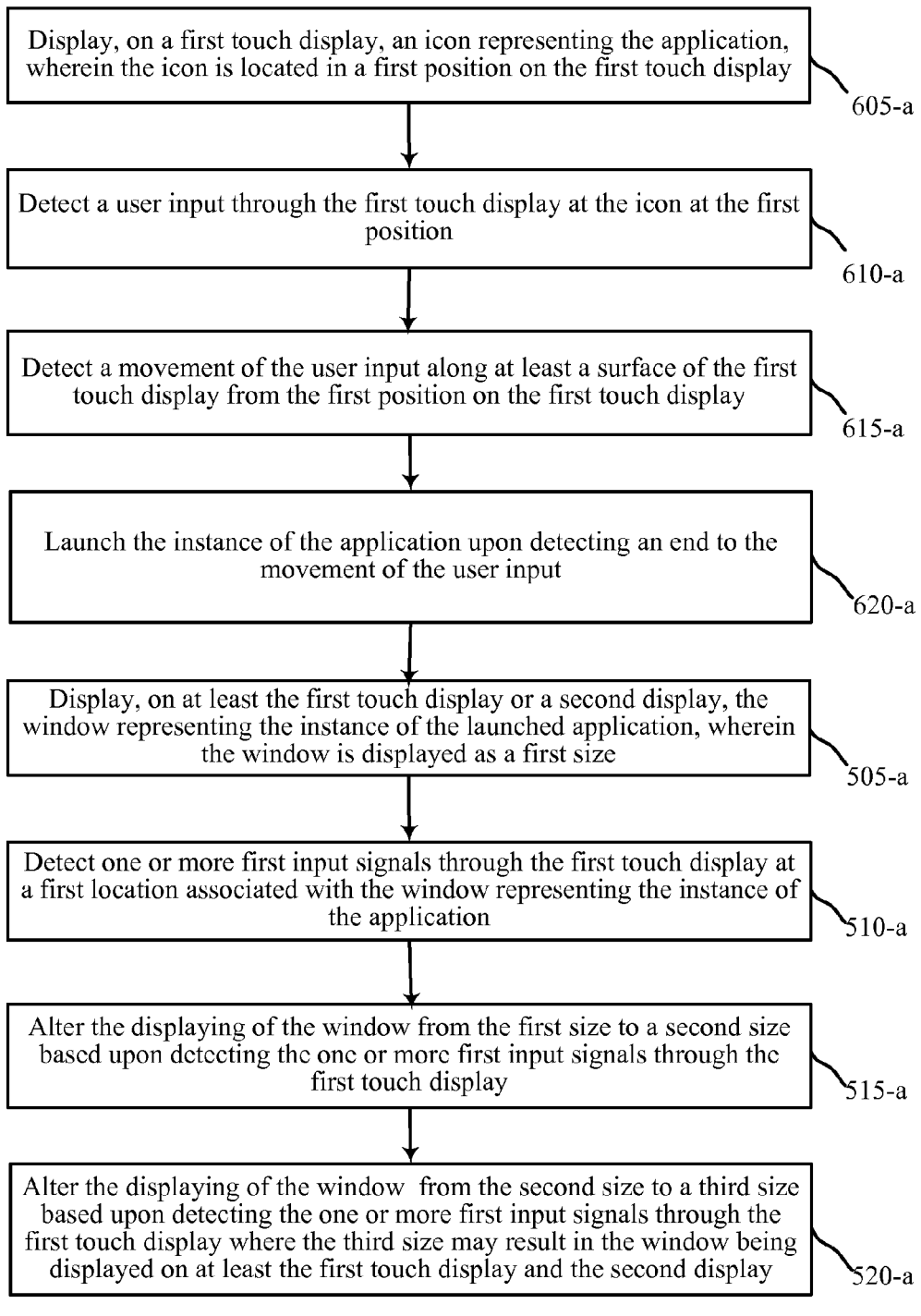
FIG. 7 is a flowchart of a method for launching applications and for managing application windows in accordance with various embodiments.

Turning to FIG. 7, a flow diagram of a method 700 to launch an instance of an application and to manage a window representing the instance of an application in accordance with various embodiments is provided. Method 700 may be implemented on a variety of different multi-display device(s) including, but not limited to, devices 110, 110-*a*, 110-*b*, 110-*c*, 400-*a*, and/or 110-*d* of FIGS. 1A-1D, 2A-2D, 3A-3D, and 4A-4B, respectively. Method 700 may utilize aspects of method 500 of FIG. 5 and/or method 600 of FIG. 6.

At block 605-*a*, an icon representing the application may be displayed on a first touch display. The icon may be located in a first position on the first touch display. At block 610-*a*, a user input may be detected through the first touch display at the icon at the first position. At block 615-*a*, a movement of the user input may be detected along at least a surface of the first touch display from the first position on the first touch display. At block 620-*a*, the instance of the application may be launched by a processor upon detecting an end to the movement of the user input. At block 505-*a*, the window representing the instance of the application may be displayed on at least the first touch display or a second display. The window may be displayed as a first size. At block 510-*a*, one or more first input signals may be detected through the first touch display at a first location associated with the window representing the instance of the application. At block 515-*a*, the displaying of the window may be altered from the first size to a second size based upon detecting the one or more first input signals through the first touch display. At block 520-*a*, the displaying of the window may be altered from the second size to a third size based upon detecting the one or more first input signals through the first touch display. The third size may result in the window being displayed on at least the first touch display and a second display.

Figure 8:
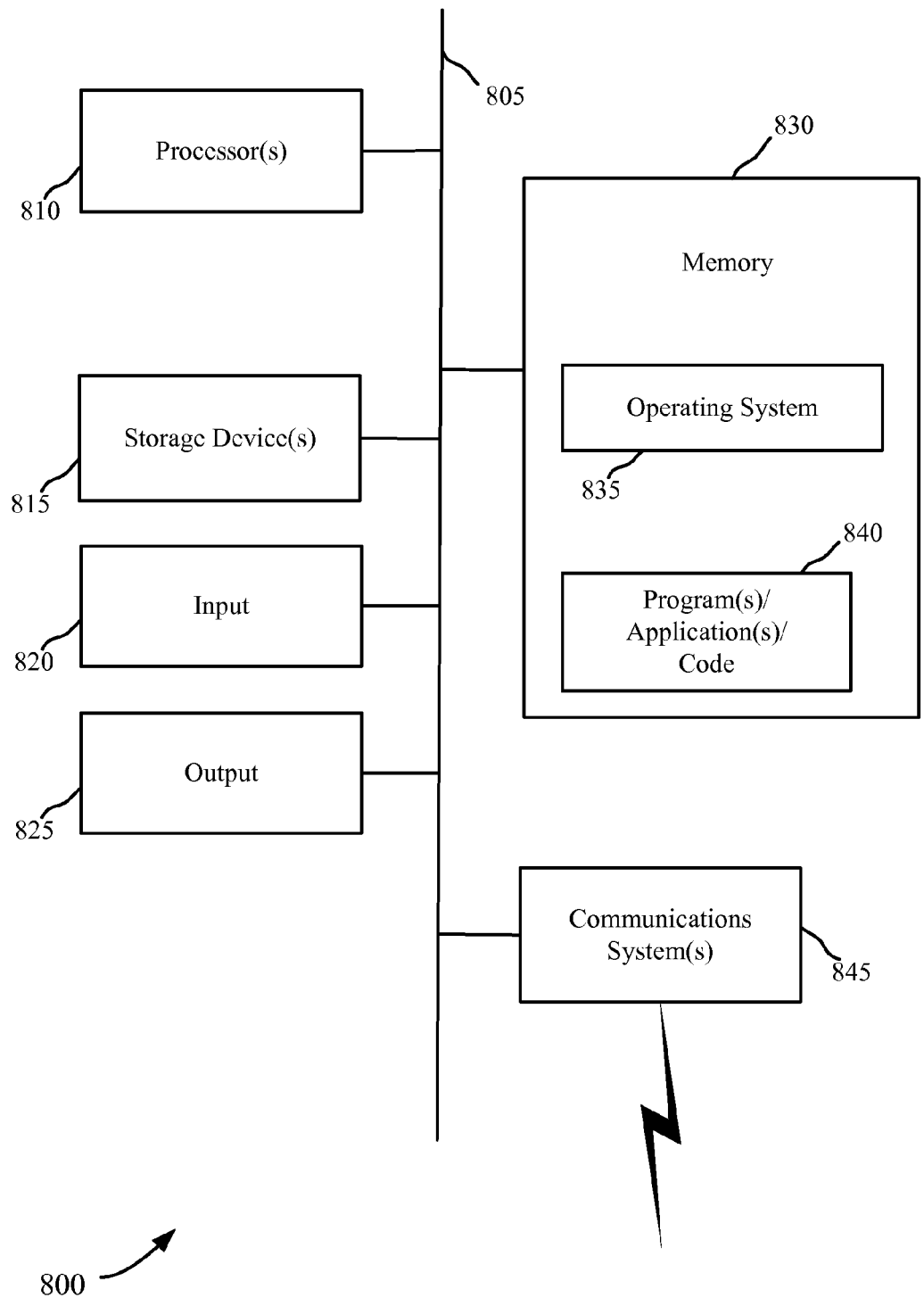
FIG. 8 is a computer system in accordance with various embodiments.

A computer system 800 that may use different methods for managing a window representing an instance of an application and/or to launch an instance of an application in accordance with various embodiments is illustrated with the schematic diagram of FIG. 8. This drawing broadly illustrates how individual system elements may be implemented, whether in a separated or more integrated manner. The exemplary structure is shown comprised of hardware elements that are electrically coupled via bus 805, including processor(s) 810 (which may further comprise a DSP or special-purpose processor), storage device(s) 815, input device(s) 820, and output device(s) 825. The storage device(s) 815 may be a machine-readable storage media reader connected to any machine-readable storage medium, the combination comprehensively representing remote, local, fixed, or removable storage devices or storage media for temporarily or more permanently containing computer-readable information. The communications system(s) 845 may interface to a wired, wireless, or other type of interfacing connection that permits data to be exchanged with other devices. The communications system(s) 845 may permit data to be exchanged with a network.

The system 800 may also include additional software elements, shown as being currently located within working memory 830, including an operating system 835 and other code 840, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

Figure 9:
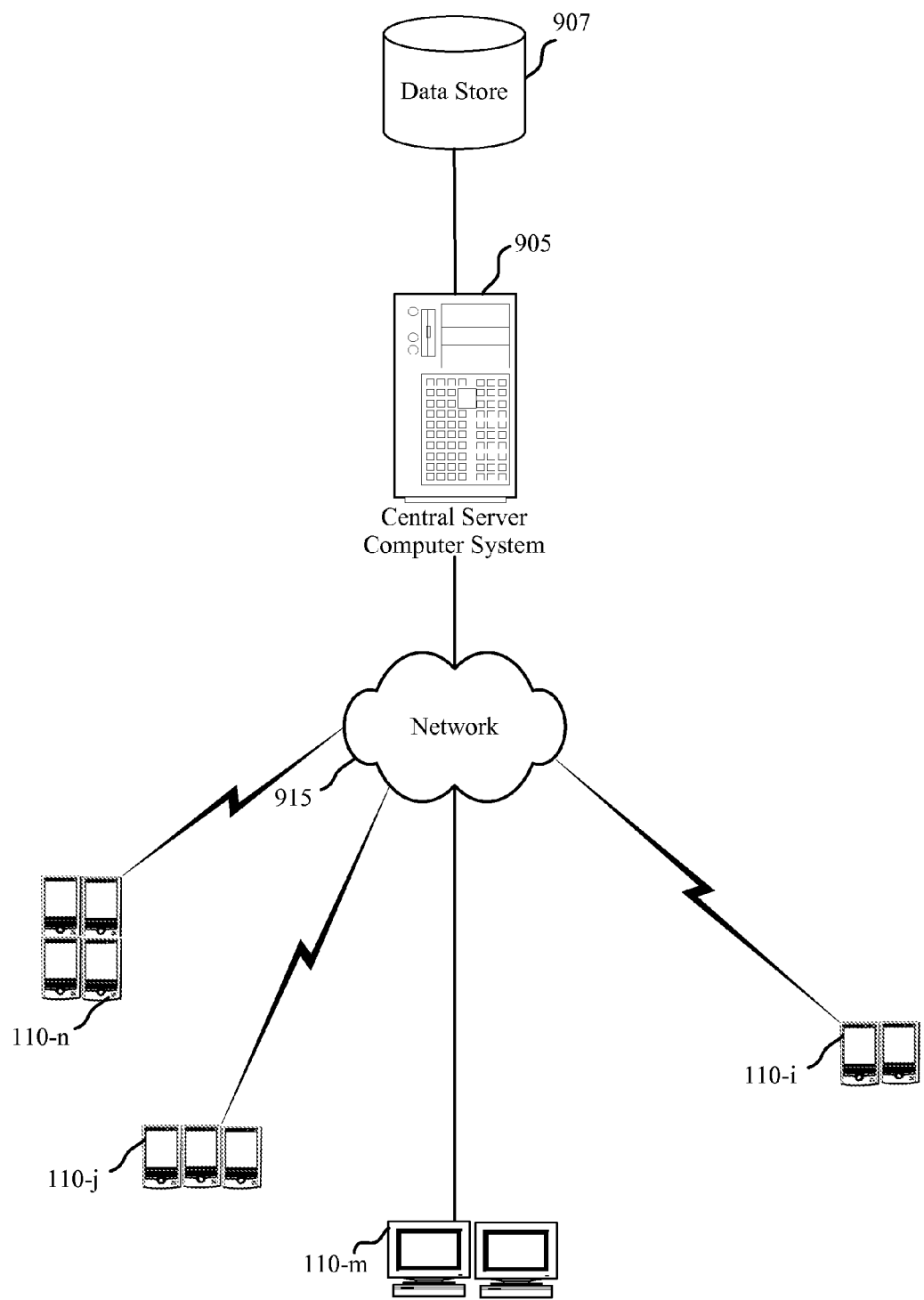
FIG. 9 is a communication network system diagram that includes multi-display devices in accordance with various embodiments.

FIG. 9 illustrates a communication network system 900 that includes multi-display devices 110-i, 110-j, 110-n, and 110-m in accordance with various embodiments. These devices 110-i, 110-j, 110-n, and/or 110-m may be examples of the devices 110, 110-a, 110-b, 110-c, 400-a, and/or 110-d of FIGS. 1A-1D, 2A-2D, 3A-3D, and 4A-4B, respectively. Merely by way of example, device 110-i is a two-display device, device 110-j is a three-display device, device 110-n is a four-display device, and device 110-m is a two-display device. System 900 may include devices 110 that may include more displays than is shown in this example. The multi-display devices 110-i, 110-j, 110-n, and/or 110-m may have any of various configurations, such as personal computers (e.g., laptop computers, net book computers, tablet computers, desktop computer, etc.), cellular telephones, PDAs, digital video recorders (DVRs), internet appliances, gaming consoles, e-readers, etc. The devices 110-i, 110-j, 110-n, and 110-m may communicate wirelessly (as shown with devices 110-i, 110-j, and/or 110-n) and/or through wired connections (as shown with device 110-m) with network 915. Through network 915, devices 110-i, 110-j, 110-n, and/or 110-m may communicate with each other or other devices. Devices 110-i, 110-j, 110-n, and/or 110-m may communicate in some cases with a server 905, which may be coupled with a data store 907.

Techniques described herein may be used for various wireless communications systems including, but not limited to, CDMA, TDMA, FDMA, OFDMA, SC-FDMA, and other systems for some embodiments. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method to manage a window representing an instance of an application, the method comprising:
    displaying, on a first touch display, the window representing the instance of the application, wherein the window is displayed as a first size;
    detecting one or more first input signals through the first touch display at a first location associated with the window representing the instance of the application;
    altering the displaying of the window from the first size to a second size based upon detecting the one or more first input signals through the first touch display; and
    altering the displaying of the window from the second size to a third size based upon detecting a continuous user input of the one or more first input signals through the first touch display for at least a first duration, wherein the third size results in the window being displayed on at least the first touch display and a second display.

2. The method of claim 1, wherein altering the displaying of the window from the first size to the second size based upon detecting the one or more input signals through the first touch display occurs during a first portion of the first duration; and
    wherein altering the displaying of the window from the second size to the third size based upon detecting the one or more input signals through the first touch display occurs during a second portion of the first duration.

3. The method of claim 1, wherein the detecting the one or more first input signals comprises:
    detecting a first plurality of input signals, wherein the first plurality of input signals includes a first subset of the first plurality of input signals and a second subset of the first plurality of input signals.

4. The method of claim 3, wherein:
    altering the displaying of the window from the first size to the second size based upon detecting the one or more input signals through the first touch display occurs after detecting the first subset plurality of input signals of the first plurality of input signals; and
    wherein altering the displaying of the window from the second size to the third size based upon detecting the one or more input signals through the first touch display occurs after the second subset of input signals of the first plurality of input signals.

5. The method of claim 1, further comprising:
    altering the displaying of the window from the third size to a fourth size based upon detecting the one or more first input signals through the first touch display, wherein the fourth size results in the window being displayed on at least the first touch display, the second display, and a third display.

6. The method of claim 1, wherein:
    the window displayed as the first size occupies a first portion of the first touch display;
    the window displayed as the second size occupies substantially all of the first touch display; and
    the window displayed as the third size occupies substantially all of the first touch display and the second display.

7. The method of claim 1, further comprising:
    detecting one or more second input signals through the first touch display at the first location associated with the window representing the instance of the application;
    detecting one or more third input signals through the first touch display at a second location different from the first location associated with the window representing the instance of the application;
    altering the displaying of the window from the third size to the second size based upon detecting the one or more second input signals and the one or more third input signals through the first touch display; and
    altering the displaying of the window from the second size to the first size based upon detecting the one or more second input signals and the one or more third input signals through the first touch display.

8. The method of claim 7, further comprising altering the displaying of the window from the first size to a minimized size where the window is no longer visible.

9. The method of claim 1, further comprising:
    receiving one or more user selections through the first touch display selecting at least the first size, the second size, or the third size.

10. A system for managing a window representing an instance of an application, the system comprising:
    a means for displaying, on a first touch display, the window representing the instance of the application, wherein the window is displayed as a first size;
    a means for detecting one or more first input signals through the first touch display at a first location associated with the window representing the instance of the application;
    a means for altering the displaying of the window from the first size to a second size based upon detecting the one or more first input signals through the first touch display; and
    a means for altering the displaying of the window from the second size to a third size based upon detecting a continuous user input of the one or more first input signals through the first touch display for at least a first duration, wherein the third size results in the window being displayed on at least the first touch display and a second display.

11. A multi-display device configured to manage a window representing an instance of an application, the multi-display device comprising:
    a first touch display configured to display the window representing the instance of the application, wherein the window is displayed as a first size;

an input detection module configured to detect one or more first input signals through the first touch display at a first location associated with the window representing the instance of the application; and an application window management module configured to:
alter the displaying of the window from the first size to a second size based upon detecting the one or more first input signals through the first touch display; and
alter the displaying of the window from the second size to a third size based upon detecting a continuous user input of the one or more first input signals through the first touch display for at least a first duration, wherein the third size results in the window being displayed on at least the first touch display and a second display.

12. The device of claim 11, wherein the application window management module configured to alter the displaying of the window from the first size to the second size based upon detecting the one or more input signals through the first touch display occurs during a first portion of the first duration; and configured to alter the displaying of the window from the second size to the third size based upon detecting the one or more input signals through the first touch display occurs during a second portion of the first duration.

13. The device of claim 11, wherein the input detection module configured to detect the one or more first input signals comprises detecting a first plurality of input signals, wherein the first plurality of input signals includes a first subset of first plurality of input signals and a second subset of the first plurality of input signals.

14. The device of claim 13, wherein the application window management module configured to alter the displaying of the window from the first size to the second size based upon detecting the one or more input signals through the first touch display occurs after detecting the first subset of input signals of the first plurality of input signals; and
wherein the application window management module configured to alter the displaying of the window from the second size to the third size based upon detecting the one or more input signals through the first touch display occurs after detecting the second subset of input signals of the first plurality of input signals.

15. The device of claim 11, wherein the application window management module is further configured to:
alter the displaying of the window from the third size to a fourth size based upon detecting the one or more first input signals through the first touch display, wherein the fourth size results in the window being displayed on at least the first touch display, the second display, and a third display.

16. The device of claim 11, wherein:
the window displayed as the first size occupies a first portion of the first touch display;
the window displayed as the second size occupies substantially all of the first touch display; and
the window displayed as the third size occupies substantially all of the first touch display and the second display.

17. The device of claim 11, wherein:
the input detection module is further configured to:
detect one or more second input signals through the first touch display at the first location associated with the window representing the instance of the application; and
detect one or more third input signals through the first touch display at a second location different from the first location associated with the window representing the instance of the application; and the application window management module is further configured to:
alter the displaying of the window from the third size to the second size based upon detecting the one or more second input signals and the one or more third input signals through the first touch display; and
alter the displaying of the window from the second size to the first size based upon detecting the one or more second input signals and the one or more third input signals through the first touch display.

18. The device of claim 17, wherein the application window management module is further configured to:
alter the displaying of the window from the first size to a minimized size where the window is no longer visible.

19. The device of claim 11, wherein the application window management module is further configured to:
receive one or more user selections through the first touch display selecting at least the first size, the second size, or the third size.

20. A computer program product for managing a window representing an instance of an application comprising:
a non-transitory computer-readable medium comprising:
code for displaying, on a first touch display, the window representing the instance of the application, wherein the window is displayed as a first size;
code for detecting one or more first input signals through the first touch display at a first location associated with the window representing the instance of the application;
code for altering the displaying of the window from the first size to a second size based upon detecting the one or more first input signals through the first touch display; and
code for altering the displaying of the window from the second size to a third size based upon detecting a continuous user input of the one or more first input signals through the first touch display for at least a first duration, wherein the third size results in the window being displayed on at least the first touch display and a second display.

21. A method to launch an instance of an application, the method comprising:
displaying, on a first touch display, an icon representing the application, wherein the icon is located in a first position on the first touch display;
detecting a user input through the first touch display at the icon at the first position;
detecting a movement of the user input along at least a surface of the first touch display from the first position on the first touch display;
displacing the icon from the first position along a path of the movement of the user input during the detected movement of the user input along the surface of the first touch display;
launching, with a processor, the instance of the application upon detecting an end to the movement of the user input;
returning the displaced icon to the first position after the processor has begun launching the instance of the application; and
displaying a window representing the launched instance of the application on at least the first touch display or a second display.

22. The method of claim 21, wherein detecting the movement of the user input along at least a surface of the first touch display from the first position on the first touch display comprises:

detecting the movement of the user input along the surface of the first touch display from the first position on the first touch display and along a surface of a second display, wherein the second display is a second touch display;

wherein launching, with the processor, the instance of the application upon detecting the end to the movement of the user input comprises launching, with the processor, the instance of the application upon detecting the end to the movement of the user input on the second touch display; and wherein displaying the window representing the launched instance of the application on at least the first touch display or the second display comprises:
displaying the window representing the launched instance of the application on the second display.

23. The method of claim 21, further comprising:
receiving a user selection through the first touch display indicating an icon arrangement mode; and
enabling the icon arrangement mode based on receiving the user selection, where enabling the icon arrangement mode disables the processor from launching the instance of the application upon detecting the end to the movement of the user input along the surface of the first touch display.

24. The method of claim 21, further comprising:
receiving a user selection through the first touch display indicating an application launch mode; and
enabling the application launch mode based on receiving the user selection, where enabling the application launch mode enables the processor to launch the instance of the application upon detecting the end to the movement of the user input along the surface of the first touch display.

25. The method of claim 21, further comprising:
receiving a user selection through the first touch display selecting a position for displaying the window representing the launched instance of the application on at least the first touch display or a second display.

26. A system for launching an instance of an application, the system comprising:
a means for displaying, on a first touch display, an icon representing the application, wherein the icon is located in a first position on the first touch display;
a means for detecting a user input through the first touch display at the icon at the first position;
a means for displacing the icon from the first position along a path of the movement of the user input during the detected movement of the user input along the surface of the first touch display;
a means for launching, with a processor, the instance of the application upon detecting an end to the movement of the user input;
a means for returning the displaced icon to the first position after the processor has begun launching the instance of the application; and
a means for displaying a window representing the launched instance of the application on at least the first touch display or a second display.

27. A multi-display device configured to launch an instance of an application, the multi-display device comprising:
a first touch display configured to display an icon representing the application, wherein the icon is located in a first position on the first touch display;
an input detection module configured to detect a user input through the first touch display at the icon at the first position;
detect a movement of the user input along at least a surface of the first touch display from the first position on the first touch display;
displace the icon from the first position along a path of the movement of the user input during the detected movement of the user input along the surface of the first touch display;
an application launch module configured to launch the instance of the application upon detecting an end to the movement of the user input;
return the displaced icon to the first position after the processor has begun launching the instance of the application; and
at least the first touch display or a second display configured to display a window representing the launched instance of the application on at least the first touch display or a second display.

28. The device of claim 27, wherein:
the input detection module configured to detect the movement of the user input along at least a surface of the first touch display from the first position on the first touch display comprises:
detecting the movement of the user input along the surface of the first touch display from the first position on the first touch display and along a surface of a second display, wherein the second display is a second touch display;
the application launch module is further configured to launch the instance of the application upon detecting the end to the movement of the user input on the second touch display; and
at least the first touch display or the second display configured to display the window representing the launched instance of the application on at least the first touch display or the second display comprises:
displaying the window representing the launched instance of the application on the second display.

29. The device of claim 27, further configured to:
receive a user selection through the first touch display indicating an icon arrangement mode; and
enable the icon arrangement mode based on receiving the user selection, where enabling the icon arrangement mode disables the application launch module from launching the instance of the application upon detecting the end to the movement of the user input along the surface of the first touch display.

30. The device of claim 27, further configured to:
receive a user selection through the first touch display indicating an application launch mode; and
enable the application launch mode based on receiving the user selection, where enabling the application launch mode enables the application launch module to launch the instance of the application upon detecting the end to the movement of the user input along the surface of the first touch display.

31. The device of claim 27, further configured to:
receive a user selection through the first touch display selecting a position for displaying the window representing the launched instance of the application on at least the first touch display or a second display.

32. A computer program product for launching an instance of an application comprising:
a non-transitory computer-readable medium comprising:
code for displaying, on a first touch display, an icon representing the application, wherein the icon is located in a first position on the first touch display;

code for detecting a user input through the first touch display at the icon at the first position;

code for detecting a movement of the user input along at least a surface of the first touch display from the first position on the first touch display;

code for displacing the icon from the first position along a path of the movement of the user input during the detected movement of the user input along the surface of the first touch display;

code for launching, with a processor, the instance of the application upon detecting an end to the movement of the user input;

code for returning the displaced icon to the first position after the processor has begun launching the instance of the application; and code for displaying a window representing the launched instance of the application on at least the first touch display or a second display.

* * * * *